(12) United States Patent
Hong et al.

(10) Patent No.:    US 12,671,091 B2
(45) Date of Patent:    Jun. 30, 2026

(54) BINDER AND PREPARATION METHOD THEREOF, SEPARATOR, ELECTRODE ASSEMBLY, BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Haiyi Hong, Ningde (CN); Lei Li, Ningde (CN); Xiaonan Cheng, Ningde (CN); Jianrui Yang, Ningde (CN); Peng Wang, Ningde (CN); Yi Zheng, Ningde (CN); Chengdong Sun, Ningde (CN)

(73) Assignee: CONTEMPORARY AMPEREX TECHNOLOGY (HONG KONG) LIMITED, Hong Kong (CN)

( * ) Notice:    Subject to any disclaimer, the term of this patent is extended or adjusted under 35 U.S.C. 154(b) by 355 days.

(21) Appl. No.: 18/592,536

(22) Filed:    Mar. 1, 2024

(65)    Prior Publication Data

US 2024/0222795 A1    Jul. 4, 2024

Related U.S. Application Data

(63) Continuation of application No. PCT/CN2023/099986, filed on Jun. 13, 2023.

(30)    Foreign Application Priority Data

Jan. 4, 2023    (CN)    ......................... 202310010451.2

(51) Int. Cl.
     *H01M 4/62*            (2006.01)
(52) U.S. Cl.
     CPC ........... *H01M 4/623* (2013.01); *H01M 4/622* (2013.01)

(58) Field of Classification Search
     CPC ..................................................... H01M 4/623
     See application file for complete search history.

(56)    References Cited

U.S. PATENT DOCUMENTS

2017/0256800 A1    9/2017    Kaneda et al.
2019/0386312 A1*    12/2019    Kuzuoka ................. C08F 20/44
                              (Continued)

FOREIGN PATENT DOCUMENTS

CN    1709966 A    12/2005
CN    106663813 A    5/2017
              (Continued)

OTHER PUBLICATIONS

International Search Report received in the corresponding international application PCT/CN2023/099986, mailed on Oct. 6, 2023.
(Continued)

*Primary Examiner* — Imran Akram
(74) *Attorney, Agent, or Firm* — K&L Gates LLP

(57)    ABSTRACT

This application relates to the field of battery technologies, and in particular, to a binder and a preparation method thereof, and a separator, electrode assembly, battery cell, battery, and electric apparatus containing such binder. The binder includes a core layer structure and a shell layer structure provided on surface of the core layer structure, where the core layer structure includes a polyvinylidene fluoride polymer, and the shell layer structure includes a polyacrylate polymer. Polyvinylidene fluoride is a homopolymer with a crystallinity of about 50%, resulting in insufficient adhesion force. Therefore, in this application, the polyacrylate polymer is used to encapsulate the polyvinylidene fluoride polymer to obtain a core-shell-structured binder, so that the crystallinity of the polyvinylidene fluoride polymer in the core-shell-structured binder is improved, and adhesion performance of the core-shell-structured binder is (Continued)

improved, thereby increasing adhesion force between a separator and an electrode plate via the binder.

17 Claims, 5 Drawing Sheets

(56) References Cited

U.S. PATENT DOCUMENTS

| | | | | |
|---|---|---|---|---|
| 2020/0235373 | A1* | 7/2020 | Tanaka | H01M 50/46 |
| 2020/0235397 | A1* | 7/2020 | Kuzuoka | H01M 4/362 |
| 2023/0238585 | A1* | 7/2023 | Liu | H01M 10/052 |
| | | | | 429/163 |
| 2023/0272250 | A1* | 8/2023 | Deng | C08K 3/041 |
| | | | | 524/495 |
| 2023/0344077 | A1* | 10/2023 | Qiu | H01M 50/449 |

FOREIGN PATENT DOCUMENTS

| | | | | | |
|---|---|---|---|---|---|
| CN | 110707357 | B | | 5/2021 | |
| CN | 113555558 | A | | 10/2021 | |
| CN | 114031704 | A | | 2/2022 | |
| CN | 114163572 | A | | 3/2022 | |
| CN | 115117356 | A | | 9/2022 | |
| CN | 115842130 | A | | 3/2023 | |
| EP | 2908364 | A1 | * | 8/2015 | H01M 50/42 |
| JP | 2009267382 | A | | 11/2009 | |
| JP | 2016046231 | A | | 4/2016 | |
| KR | 20220067254 | A | * | 5/2022 | H01M 4/587 |
| WO | WO-2016047165 | A1 | * | 3/2016 | H01M 10/0525 |

OTHER PUBLICATIONS

The extended European search report received in the counterpart European application 23844524.1, mailed on Feb. 18, 2025.

* cited by examiner

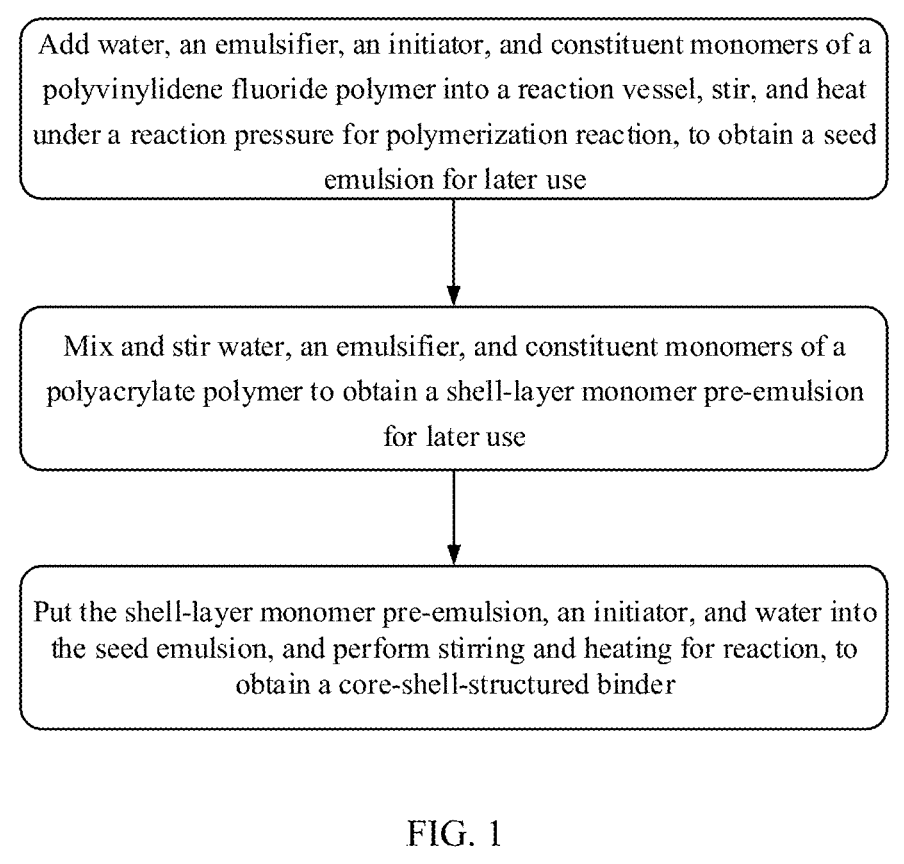

Add water, an emulsifier, an initiator, and constituent monomers of a
polyvinylidene fluoride polymer into a reaction vessel, stir, and heat
under a reaction pressure for polymerization reaction, to obtain a seed
emulsion for later use Mix and stir water, an emulsifier, and constituent monomers of a
polyacrylate polymer to obtain a shell-layer monomer pre-emulsion
for later use Put the shell-layer monomer pre-emulsion, an initiator, and water into
the seed emulsion, and perform stirring and heating for reaction, to
obtain a core-shell-structured binder

FIG. 1

Add water, an emulsifier, an initiator, and constituent monomers of a polyvinylidene fluoride polymer into a reaction vessel, stir, and heat under a reaction pressure for polymerization reaction, to obtain a seed emulsion for later use

↓

Mix and stir water, an emulsifier, and constituent monomers of a polyacrylate polymer to obtain a shell-layer monomer pre-emulsion for later use

↓

Put the shell-layer monomer pre-emulsion, an initiator, and water into the seed emulsion, and perform stirring and heating for reaction, to obtain a core-shell-structured binder, where a mass ratio of the constituent monomers of the polyvinylidene fluoride polymer to the constituent monomers of the polyacrylate polymer is (2– 100):1, optionally (10–80):1

FIG. 2

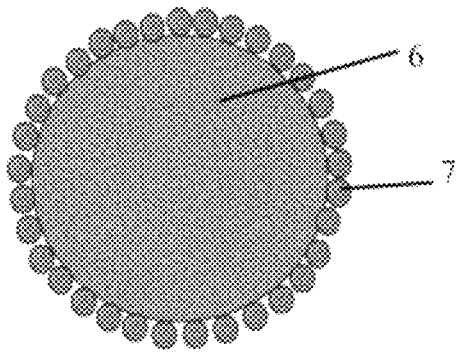

FIG. 3

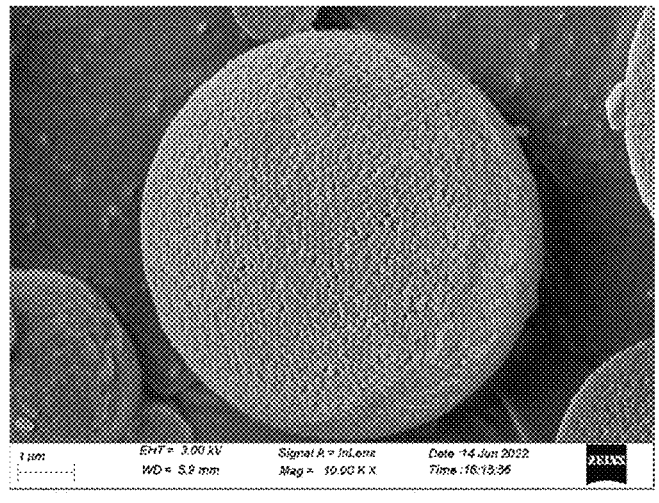
FIG. 4
5
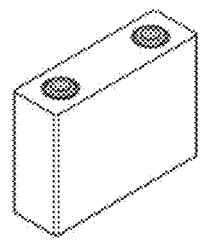
FIG. 5

BINDER AND PREPARATION METHOD THEREOF, SEPARATOR, ELECTRODE ASSEMBLY, BATTERY CELL, BATTERY, AND ELECTRIC APPARATUS

RELATED APPLICATIONS

This application is a continuation of International Patent Application No. PCT/CN2023/099986, filed on Jun. 13, 2023, which claims priority to Chinese Patent Application No. 202310010451.2 filed on Jan. 4, 2023, which is incorporated herein by reference in its entirety.

TECHNICAL FIELD

This application relates to the field of battery technologies, and in particular, to a binder and a preparation method thereof, a separator, an electrode assembly, a battery cell, a battery, and an electric apparatus.

BACKGROUND

With the rapid growth of portable electronic devices, electric vehicles, and the like, the demand for traction batteries is also increasing constantly. Electrochemical performance of batteries is also attracting more and more attention.

Currently, battery cells are having an opening issue. To be specific, gaps are easily formed between electrode plates and the separator, resulting in deteriorated cycling performance of batteries.

SUMMARY

This application is mainly intended to provide a binder, using the binder to increase adhesion force between the separator and the electrode plate, thus improving cycling performance of batteries.

To achieve the above objective, this application proposes a binder. The binder includes a core layer structure and a shell layer structure provided on surface of the core layer structure, where the core layer structure includes a polyacrylate polymer, and the shell layer structure includes a polyvinylidene fluoride polymer.

The binder of this application includes the core layer structure and the shell layer structure provided on the surface of the core layer structure, where the core layer structure includes the polyvinylidene fluoride polymer, and the shell layer structure includes the polyacrylate polymer. Polyvinylidene fluoride is a homopolymer with a crystallinity of about 50%, resulting in insufficient adhesion force. Therefore, in this application, the polyacrylate polymer is used to encapsulate the polyvinylidene fluoride polymer to obtain the core-shell-structured binder, so that the crystallinity of the polyvinylidene fluoride polymer in the core-shell-structured binder is improved, and adhesion performance of the core-shell-structured binder is improved, thereby increasing adhesion force between a separator and an electrode plate via the binder.

Optionally, the shell layer structure includes multiple shells, the multiple shells being spaced apart on the surface of the core layer structure.

The shells formed by the polyacrylate polymer do not continuously encapsulate the surface of the core layer structure, but are attached at intervals to the surface of the core layer structure, like a raspberry-shaped structure. It can be understood that the shell layer structure is formed by multiple shells; a gap may be present between adjacent two of the shells; and at the positions of the gaps, the surface of the core layer structure can be exposed. In this way, the polyvinylidene fluoride polymer core layer structure is exposed. Since the core layer structure also has good adhesion, the core layer structure exposed between the shells can have improved adhesion performance. In addition, compared with a structure in which the core layer is totally encapsulated by the shell layer, the raspberry-shaped core-shell structure has a larger specific surface area. Thus, a surface structure with an adhesion function can have a better adhesion effect.

Optionally, a mass ratio of the polyvinylidene fluoride polymer to the polyacrylate polymer is (2-100):1, optionally (10-80):1.

In order to obtain the raspberry-shaped core-shell structure mentioned above, the polyvinylidene fluoride polymer has a larger mass than the polyacrylate polymer. The core layer structure having a larger mass than the shell layer structure ensures that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that a mass ratio of the core layer structure to the shell layer structure is (2-100):1, where in (2-100):1, the values include minimum and maximum values of the range and each value between such minimum and maximum values. Specific examples include but are not limited to point values in the embodiments and 2:1, 10:1, 20:1, 30:1, 40:1, 50:1, 60:1, 70:1, 80:1, 90:1, 100:1, and the like.

Optionally, the mass ratio of the polyvinylidene fluoride polymer to the polyacrylate polymer is (10-80):1.

In order to obtain the raspberry-shaped core-shell structure mentioned above, the polyvinylidene fluoride polymer has a larger mass than the polyacrylate polymer. The core layer structure having a larger mass than the shell layer structure ensures that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that the mass ratio of the core layer structure to the shell layer structure is (10-80):1, where in (10-80):1, the values include minimum and maximum values of the range and each value between such minimum and maximum values. Specific examples include but are not limited to point values in the embodiments and 10:1, 20:1, 30:1, 40:1, 50:1, 60:1, 70:1, 80:1, and the like.

Optionally, a median particle size by volume $D_v50$ of the binder is 0.5 μm-50 μm, optionally 7 μm-8 μm.

Theoretically, the median particle size by volume $D_v50$ of the binder in this application may be less than 0.5 μm or greater than 50 μm. However, with consideration that the binder in this application is used on a separator, the median particle size by volume $D_v50$ of the binder can be neither excessively large nor excessively small. Excessively small binder is prone to block pores of a separator and reduce passage of lithium ions through the separator; and excessively large binder, when applied on a separator, may lead to formation of a thicker coating, affecting energy density of the subsequently prepared battery. Therefore, the median particle size by volume $D_v50$ of the binder is 0.5 μm-50 μm, where in 0.5 μm-50 μm, the values include minimum and maximum values of the range and each value between such minimum and maximum values. Specific examples include but are not limited to point values in the embodiments and 0.5 μm, 1 μm, 5 μm, 10 μm, 15 μm, 20 μm, 25 μm, 30 μm, 35 μm, 40 μm, 45 μm, 50 μm, and the like.

Optionally, the median particle size by volume $D_v50$ of the binder is 7 μm-8 μm.

When the median particle size by volume $D_v50$ of the binder is 7 μm-8 μm, the obtained separator features good performance. In 7 μm-8 μm, the values include minimum and maximum values of the range and each value between such minimum and maximum values. Specific examples include but are not limited to point values in the embodiments and 7 μm, 7.5 μm, 8 μm, and the like.

Optionally, constituent monomers of the polyacrylate polymer include a first polymeric flexible monomer, a second polymeric polar monomer, and a third polymeric molecular weight regulating monomer.

In this application, the constituent monomers of the polyacrylate polymer include the first polymeric flexible monomer, the second polymeric polar monomer, and the third polymeric molecular weight regulating monomer, and the polymer is obtained through a crosslinking reaction of the three monomers. Molecular weight and glass transition temperature of the polymer can be controlled to improve the adhesion performance of the binder.

Optionally, a molar ratio of the first polymeric flexible monomer, the second polymeric polar monomer, and the third polymeric molecular weight regulating monomer is 1:(0.01-0.8):(0.01-0.15), optionally 1:(0.05-0.7):(0.05-0.12).

When the molar ratio of the first polymeric flexible monomer, the second polymeric polar monomer, and the third polymeric molecular weight regulating monomer is 1:(0.01-0.8):(0.01-0.15), the binder features good adhesion. In 1:(0.01-0.8):(0.01-0.15), the values include minimum and maximum values of the range and each value between such minimum and maximum values. Specific examples include but are not limited to point values in the embodiments and 1:0.01:0.01, 1:0.1:0.01, 1:0.4:0.01, 1:0.8:0.01, 1:0.01:0.05, 1:0.01:0.1, 1:0.01:0.15, 1:0.1:0.01, 1:0.1:0.05, 1:0.1:0.15, 1:0.4:0.01, 1:0.4:0.05, 1:0.4:0.15, 1:0.8:0.01, 1:0.8:0.05, 1:0.8:0.15, and the like.

Optionally, the molar ratio of the first polymeric flexible monomer, the second polymeric polar monomer, and the third polymeric molecular weight regulating monomer is 1:(0.05-0.7):(0.05-0.12).

When the molar ratio of the first polymeric flexible monomer, the second polymeric polar monomer, and the third polymeric molecular weight regulating monomer is 1:(0.05-0.7):(0.05-0.12), the binder features good adhesion. In 1:(0.05-0.7):(0.05-0.12), the values include minimum and maximum values of the range and each value between such minimum and maximum values. Specific examples include but are not limited to point values in the embodiments and 1:0.05:0.05, 1:0.1:0.05, 1:0.4:0.05, 1:0.7:0.05, 1:0.1:0.05, 1:0.1:0.1, 1:0.1:0.12, and the like.

Optionally, the first polymeric flexible monomer contains an ester bond in structure, the second polymeric polar monomer contains a cyano group in structure, and the third polymeric molecular weight regulating monomer contains an amide bond.

The ester bond can improve the flexibility of a molecular chain, the cyano group can improve the polarity of the monomer, and the amide bond has polarity and can easily form a hydrogen bond, thereby improving adhesion. The first polymeric flexible monomer contains the ester bond in structure, the second polymeric polar monomer contains the cyano group in structure, and the third polymeric molecular weight regulating monomer contains the amide bond, so that with the polymer obtained by polymerization of the above three monomers, the molecular weight and glass transition temperature of the polymer can be controlled to improve the adhesion performance of the binder.

Optionally, the first polymeric flexible monomer is an acrylate monomer, the second polymeric polar monomer is an acrylonitrile monomer, and the third polymeric molecular weight regulating monomer is an acrylamide monomer.

The acrylate monomer can improve swelling resistance of the polymer, and as a flexible monomer chain segment in a molecular chain segment, can regulate the glass transition temperature of the polymer and improve toughness of the binder when the binder is applied, thereby helping achieve good adhesion. The acrylonitrile monomer has a cyano group with strong polarity, conducive to improving ionic conductivity and improving adhesion. The acrylamide monomer has a function of regulating the molecular weight and also features good adhesion. With the polymer prepared using the above three types of monomers, the molecular weight and glass transition temperature of the polymer can be controlled to improve the adhesion performance of the binder.

Optionally, the acrylate monomer includes at least one of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate;

and/or the acrylonitrile monomer includes at least one of acrylonitrile and methacrylonitrile;

and/or the acrylamide monomer includes at least one of acrylamide, N-methylolacrylamide, and N-butoxymethylacrylamide.

Based on the fact that the acrylate monomer helps improve the adhesion of the binder, the acrylate monomer may include at least one of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate. To be specific, the constituent monomers of the polyacrylate polymer may include one of the above acrylate monomers, or may include more than one of the above acrylate monomers, which is not specifically limited.

Based on the fact that the acrylonitrile monomer helps improve the adhesion of the binder, the acrylonitrile monomer includes at least one of acrylonitrile and methacrylonitrile. To be specific, the constituent monomers of the polyacrylate polymer may include one of the above acrylonitrile monomers or may include more than one of the above acrylonitrile monomers, which is not specifically limited.

Based on the fact that the acrylamide monomer helps improve the adhesion of the binder, the acrylamide monomer includes at least one of acrylamide, N-methylolacrylamide, and N-butoxymethylacrylamide. To be specific, the constituent monomers of the polyacrylate polymer may include one of the above acrylamide monomers, or may include more than one of the above acrylamide monomers, which is not specifically limited.

Optionally, the polyvinylidene fluoride polymer includes at least one of vinylidene fluoride polymer, vinylidene fluoride-hexafluoropropylene copolymer, vinylidene fluoride-pentafluoropropylene copolymer, vinylidene fluoride-tetrafluoropropylene copolymer, vinylidene fluoride-trifluoropropylene copolymer, vinylidene fluoride-perfluorobutene copolymer, vinylidene fluoride-tetrafluoroethylene copolymer, vinylidene fluoride-trifluoroethylene copolymer, vinylidene fluoride-trifluorochloroethylene copolymer, or vinylidene fluoride-fluoroethylene copolymer.

In addition to good chemical resistance and corrosion resistance, the polyvinylidene fluoride polymer also has special properties such as high temperature resistance, oxidization resistance, weather resistance, and radiation resistance, features piezoelectricity, dielectricity, and thermoelectric property, and is commonly used in lithium-ion battery separators.

The polyvinylidene fluoride polymer used in this application includes at least one of vinylidene fluoride polymer, vinylidene fluoride-hexafluoropropylene copolymer, vinylidene fluoride-pentafluoropropylene copolymer, vinylidene fluoride-tetrafluoropropylene copolymer, vinylidene fluoride-trifluoropropylene copolymer, vinylidene fluoride-perfluorobutene copolymer, vinylidene fluoride-tetrafluoroethylene copolymer, vinylidene fluoride-trifluoroethylene copolymer, vinylidene fluoride-trifluorochloroethylene copolymer, or vinylidene fluoride-fluoroethylene copolymer. To be specific, the polyvinylidene fluoride polymer may include one of the above polyvinylidene fluoride polymers or may include more than one of the above polyvinylidene fluoride polymers, which is not specifically limited.

This application further provides a preparation method of binder including:

adding water, an emulsifier, an initiator, and constituent monomers of a polyvinylidene fluoride polymer into a reaction vessel, stirring, and heating under a reaction pressure for polymerization reaction, to obtain a seed emulsion for later use;

mixing and stirring water, an emulsifier, and constituent monomers of a polyacrylate polymer to obtain a shell-layer monomer pre-emulsion for later use; and putting the shell-layer monomer pre-emulsion, an initiator, and water into the seed emulsion, and performing stirring and heating for reaction, to obtain a core-shell-structured binder.

In this application, the seed emulsion of the polyvinylidene fluoride polymer of the core layer is obtained first through emulsion polymerization, and then the polyacrylate polymer of the shell layer is prepared on the surface of the core layer structure through emulsion polymerization, and ultimately a core-shell-structured binder is formed.

Optionally, a mass ratio of the constituent monomers of the polyvinylidene fluoride polymer to the constituent monomers of the polyacrylate polymer is (2-100):1, optionally (10-80):1.

In order to obtain the raspberry-shaped core-shell structure mentioned above, the core layer structure has a larger mass than the shell layer structure to ensure that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that a mass ratio of the core layer structure to the shell layer structure is (2-100):1, where in (2-100):1, the values include minimum and maximum values of the range and each value between such minimum and maximum values. Specific examples include but are not limited to point values in the embodiments and 2:1, 10:1, 20:1, 30:1, 40:1, 50:1, 60:1, 70:1, 80:1, 90:1, 100:1, and the like.

Optionally, the mass ratio of the constituent monomers of the polyvinylidene fluoride polymer to the constituent monomers of the polyacrylate polymer is (10-80):1.

In order to obtain the raspberry-shaped core-shell structure mentioned above, the core layer structure has a larger mass than the shell layer structure to ensure that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that the mass ratio of the core layer structure to the shell layer structure is (10-80):1, where in (10-80):1, the values include minimum and maximum values of the range and each value between such minimum and maximum values. Specific examples include but are not limited to point values in the embodiments and 10:1, 20:1, 30:1, 40:1, 50:1, 60:1, 70:1, 80:1, and the like.

Optionally, the constituent monomers of the polyvinylidene fluoride polymer include vinylidene fluoride;

or the constituent monomers of the polyvinylidene fluoride polymer include at least one of vinylidene fluoride, hexafluoropropylene, pentafluoropropylene, tetrafluoropropylene, trifluoropropylene, perfluorobutene, tetrafluoroethylene, trifluoroethylene, trifluorochloroethylene, and fluoroethylene.

The polyvinylidene fluoride polymer refers to a polymer with vinylidene fluoride as monomers. In addition to vinylidene fluoride, the monomers of the polyvinylidene fluoride polymer further include at least one of hexafluoropropylene, pentafluoropropylene, tetrafluoropropylene, trifluoropropylene, perfluorobutene, tetrafluoroethylene, trifluoroethylene, trifluorochloroethylene, and fluoroethylene. To be specific, the polyvinylidene fluoride polymer may be a homopolymer of vinylidene fluoride or a copolymer of vinylidene fluoride and other fluorine-containing ethylene, which is not specifically limited.

An embodiment of this application provides a separator, where the separator is provided with the foregoing binder or a binder prepared using the foregoing preparation method of binder.

The separator being coated with the foregoing binder can improve adhesion performance between an electrode plate and the binder, and alleviate the opening issue in the existing pre-cold pressing process for cells.

An embodiment of this application provides an electrode assembly, where the electrode assembly includes the foregoing separator.

The electrode assembly includes a positive electrode plate, a negative electrode plate, and a separator. The binder is applied on the separator to adhere the electrode plates and the separator together, so as to alleviate the opening issue of electrode plates and separators.

An embodiment of this application provides a battery cell, where the battery cell includes the foregoing electrode assembly.

The foregoing electrode assembly being applied to the battery cell can improve large-clamp cycling performance of the battery cell.

An embodiment of this application provides a battery, where the battery includes the foregoing battery cell.

An embodiment of this application provides an electric apparatus, where the electric apparatus includes the foregoing battery cell or the foregoing battery.

BRIEF DESCRIPTION OF DRAWINGS

To describe the technical solutions of the embodiments of this application or the prior art more clearly, the following briefly describes the accompanying drawings required for describing the embodiments or the prior art. Apparently, the accompanying drawings in the following descriptions show merely some embodiments of this application, and persons of ordinary skill in the art may still derive other drawings from the accompanying drawings without creative efforts.

FIG. 1 is a schematic flowchart of a preparation method of binder according to an embodiment of this application;

FIG. 2 is a schematic flowchart of a preparation method of binder according to an embodiment of this application;

FIG. 3 is a schematic structural diagram of a core-shell structure of a binder according to an embodiment of this application;

FIG. 4 is a scanning electron microscope image of a binder according to an embodiment of this application;

FIG. 5 is a schematic diagram of an electrode assembly according to an embodiment of this application;

DESCRIPTION OF REFERENCE SIGNS

Figure 6:
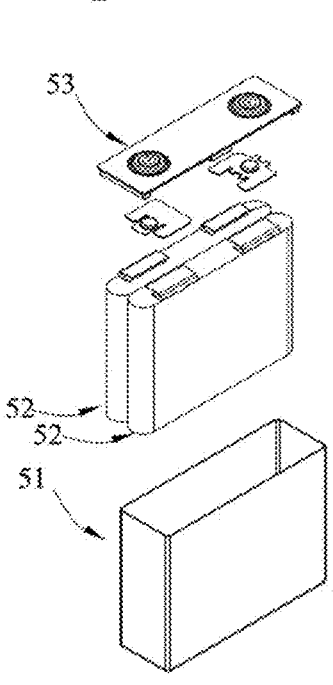
FIG. 6 is an exploded view of the electrode assembly according to the embodiment of this application in FIG. 5.

| Reference sign | Name | Reference sign | Name |
|---|---|---|---|
| 1 | Battery pack | 51 | Shell |
| 2 | Upper box body | 52 | Electrode assembly |
| 3 | Lower box body | 53 | Cover plate |
| 4 | Battery module | 6 | Core layer structure |
| 5 | Battery | 7 | Shell layer structure |

The achievement of the objectives, functional features, and advantages of this application are further described in connection with the embodiments and with reference to the accompanying drawings.

DESCRIPTION OF EMBODIMENTS

The following clearly and completely describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts shall fall within the protection scope of this application.

The following specifically discloses in detail embodiments of the binder and preparation method thereof, and the separator, electrode assembly, battery cell, battery, and electric apparatus containing such binder of this application, with appropriate reference to the accompanying drawings. However, there may be cases where unnecessary detailed descriptions are omitted. For example, detailed descriptions of well-known matters and repeated descriptions of actually identical structures have been omitted. This is to prevent the following descriptions from becoming unnecessarily cumbersome, facilitating understanding of persons skilled in the art. In addition, the accompanying drawings and the following descriptions are provided for persons skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that special range. Ranges defined in this way may or may not include end values, and any combination may be used, meaning that any lower limit may be combined with any upper limit to form a range. For example, if ranges of 60-120 and 80-110 are provided for a specific parameter, it should be understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers from "0-5" are listed herein, and "0-5" is just an abbreviated representation of a combination of these values. In addition, when a parameter is expressed as an integer greater than or equal to 2, this is equivalent to disclosure that the parameter is, for example, an integer: 2, 3, 4, 5, 6, 7, 8, 9, 10, 11, or 12.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed sequentially or randomly, preferably, performed sequentially. For example, the method including steps (a) and (b) indicates that the method may include steps (a) and (b) performed sequentially or may include steps (b) and (a) performed sequentially. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Battery cells have an opening issue. To be specific, gaps are easily formed between electrode plates and separators, resulting in deteriorated cycling performance of batteries.

For example, polyvinylidene fluoride, as the most commonly used binder, has been widely used in separators. However, at present, the price of polyvinylidene fluoride has risen sharply, resulting in a tight market supply. The surface of a lithium battery separator being coated with a polyvinylidene fluoride polymer can partially solve the problem of high-temperature shrinkage of the separator; a cell is cold-pressed after winding; however, common polyvinylidene fluoride is a homopolymer with a crystallinity of about 50%, resulting in insufficient adhesion force between the separator and the positive and negative electrode plates. This often leads to the opening issue of cells, and performance requirements for coated separators of traction lithium-ion batteries cannot be satisfied.

In other words, the surface of the battery separator being coated with the polyvinylidene fluoride polymer can partially solve the problem of high-temperature shrinkage of the separator; the cell is cold-pressed after winding; however, common polyvinylidene fluoride is a homopolymer with a crystallinity of about 50%, resulting in insufficient adhesion force between the separator and the positive and negative electrode plates. This often leads to the opening issue of cells. Presence of openings in the cell leads to formation of gaps between the electrode plates and the separator, so that the overall structure of the cell is loose, and the cell has lower hardness, resulting in deteriorated cycling performance of the cell.

A cell is formed by adhering positive and negative electrode plates and a separator, and has certain hardness. To be specific, the adhered positive and negative electrode plates and separator are attached to and support each other to form a structure with a certain thickness, and this structure with a certain thickness has certain hardness. The negative electrode swells during charging and discharging, and if adhesion force is small, gaps will be formed between the positive and negative electrode plates and the separator, thus the positive and negative electrode plates and the separator cannot be attached to and support each other, leading to a loose cell with lower hardness. In this case, kinetic performance of the cell is deteriorated, for example, rate performance is deteriorated; and cycling performance is also deteriorated. For example, in an electric vehicle, a loose battery cell in a battery leads to a lower charging speed and deteriorated cycling performance of the battery, directly resulting in a shorter service life of the battery, frequent battery replacement for the electric vehicle, and increased costs for a consumer on the electric vehicle.

In view of this, this application proposes a binder. The binder includes a core layer structure and a shell layer structure provided on surface of the core layer structure, where the shell layer structure includes a polyacrylate polymer, and the core layer structure includes a polyvinylidene fluoride polymer.

The binder refers to a material with adhesion performance for adhering different substances together.

A core-shell structure is formed by a core at the center and a shell for encapsulation at the outer layer.

The core layer structure refers to a structure located inside the core-shell structure and encapsulated by the shell at the outer layer.

The shell layer structure refers to a structure located at an outer part of the core-shell structure and encapsulating the surface of the core layer structure.

The polyacrylate polymer is a polymer with acrylates as monomers.

The polyvinylidene fluoride polymer is a polymer with vinylidene fluoride as monomers.

In this application, the polyacrylate polymer is used to encapsulate the polyvinylidene fluoride polymer to obtain a core-shell-structured binder, so that the crystallinity of the polyvinylidene fluoride polymer in the core-shell-structured binder is improved, and adhesion performance of the core-shell-structured binder is improved, thereby increasing adhesion force between a separator and an electrode plate via the binder. The binder of this application provides good adhesion performance, such that swelling of an electrode plate does not lead to separation of the electrode plate from a separator, allowing a cell to maintain good hardness, and thus improving kinetic performance and cycling performance of the cell.

Theoretically, as the crystallinity increases, molecular chains are arranged closely in order, porosity is low, intermolecular interaction forces increase, chain segment movement becomes difficult, and yield stress, strength, modulus, hardness, and the like of the polymer are all improved; however, elongation at break and impact toughness are reduced. Apparently, crystallization makes the polymer become hard and brittle and also have deteriorated adhesion performance.

In this application, the polyacrylate polymer is used to encapsulate the polyvinylidene fluoride polymer. Compared with polyvinylidene fluoride that is not encapsulated, the core-shell-structured binder of this application has reduced overall crystallinity and improved adhesion performance. Therefore, the use of such core-shell-structured binder can increase adhesion force between a separator and an electrode plate, avoiding the opening issue of cells. In addition, the reduced crystallinity makes a molecular structure in the binder be highly disordered and have high porosity, and further improves liquid infiltration for the binder. Applying the binder to a separator helps to improve electrolyte infiltration for the separator and improve cycling performance of a battery.

In some embodiments, the shell layer structure includes multiple shells, the multiple shells being spaced apart on the surface of the core layer structure.

As shown in FIG. 3 and FIG. 4, the shells formed by the polyacrylate polymer do not continuously encapsulate the surface of the core layer structure, but are attached at intervals to the surface of the core layer structure, like a raspberry-shaped structure. It can be understood that the shell layer structure is formed by multiple shells; a gap may be present between adjacent two of the shells; and at the positions of the gaps, the surface of the core layer structure can be exposed. In this way, the polyvinylidene fluoride polymer core layer structure is exposed. Since the core layer structure also has good adhesion, the core layer structure exposed between the shells can also improve adhesion performance. In addition, upon comparison between a manner in which the shell layer structure does not continuously encapsulate the core layer structure and a manner in which the shell layer structure totally encapsulates the core layer structure, the former manner achieves a larger specific surface area. Thus, a surface structure with an adhesion function can have a better adhesion effect.

It can be understood that no crosslinking reaction takes place between functional groups on the surface of the polyvinylidene fluoride polymer core layer and the polyacrylate polymer shell layer, and an ionic bonding mechanism mainly works between the core layer and the shell layer, such that the constituent monomers of the polyvinylidene fluoride polymer are adsorbed onto the constituent monomers of the polyacrylate polymer under the actions of ionic bonds, the Van Der Waals force, and the like.

In some embodiments, a mass ratio of the polyvinylidene fluoride polymer to the polyacrylate polymer is (2-100):1, optionally (10-80):1.

In order to obtain the raspberry-shaped core-shell structure mentioned above, the polyvinylidene fluoride polymer has a larger mass than the polyacrylate polymer. The core layer structure having a larger mass than the shell layer structure ensures that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that a mass ratio of the core layer structure to the shell layer structure is (2-100):1, where in (2-100):1, the values include minimum and maximum values of the range and each value between such minimum and maximum values. Specific examples include but are not limited to point values in the embodiments and 2:1, 10:1, 20:1, 30:1, 40:1, 50:1, 60:1, 70:1, 80:1, 90:1, 100:1, and the like.

In some embodiments, the mass ratio of the core layer structure to the shell layer structure is (10-80):1.

In order to obtain the raspberry-shaped core-shell structure mentioned above, the polyvinylidene fluoride polymer has a larger mass than the polyacrylate polymer. The core layer structure having a larger mass than the shell layer structure ensures that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that the mass ratio of the core layer structure to the shell layer structure is (10-80):1, where in (10-80):1, the values include minimum and maximum values of the range and each value between such minimum and maximum values. Specific examples include but are not limited to point values in the embodiments and 10:1, 20:1, 30:1, 40:1, 50:1, 60:1, 70:1, 80:1, and the like.

For a mass ratio test method, during preparation of the binder, mass of monomers put during reaction for preparation of a core layer structure is recorded as m, mass of monomers for preparation of a shell layer structure is recorded as n, and then a mass ratio of the core layer structure to the shell layer structure is m:n.

In some embodiments, the median particle size by volume $D_v50$ of the binder is 0.5 μm-50 μm, optionally 7 μm-8 μm.

The median particle size by volume $D_v50$ of the binder may be measured using a well-known method in the art. For example, it may be measured in accordance with GB/T 19077-2016 using a Malvern laser particle size analyzer for a characterization test, for example, using an instrument such as Mastersizer-3000 from Malvern for the test.

Theoretically, the median particle size by volume $D_v50$ of the binder in this application may be less than 0.5 μm or greater than 50 μm. However, with consideration that the binder in this application is used on a separator, the median particle size by volume $D_v50$ of the binder can be neither excessively large nor excessively small. Excessively small binder is prone to block pores of a separator and reduce passage of lithium ions through the separator; and excessively large binder, when applied on a separator, may lead to formation of a thicker coating, affecting energy density of the subsequently prepared battery. Therefore, the median particle size by volume $D_v50$ of the binder is 0.5 μm-50 μm, where in 0.5 μm-50 μm, the values include minimum and maximum values of the range and each value between such minimum and maximum values. Specific examples include but are not limited to point values in the embodiments and 0.5 μm, 1 μm, 5 μm, 10 μm, 15 μm, 20 μm, 25 μm, 30 μm, 35 μm, 40 μm, 45 μm, 50 μm, and the like.

In some embodiments, the median particle size by volume $D_v50$ of the binder is 7 μm-8 μm.

When the median particle size by volume $D_v50$ of the binder is 7 μm-8 μm, the obtained separator features good performance. In 7 μm-8 μm, the values include minimum and maximum values of the range and each value between such minimum and maximum values. Specific examples include but are not limited to point values in the embodiments and 7 μm, 7.5 μm, 8 μm, and the like.

In some embodiments, constituent monomers of the polyacrylate polymer include a first polymeric flexible monomer, a second polymeric polar monomer, and a third polymeric molecular weight regulating monomer.

The flexible monomer has a lower homopolymer glass transition temperature than a rigid monomer. Compared with a rigid group, the flexible monomer has certain flexibility, with a chain segment able to move freely. The flexible monomer chain segment can regulate glass transition temperature of the polymer and improve toughness of the binder when the binder is applied, thereby helping achieve good adhesion.

The polar monomer is a monomer that contains a polar group in the monomer. The polar monomer helps improve adhesion of the polymer.

The molecular weight regulating monomer is a monomer involved in a crosslinking reaction and used for regulating a molecular weight of the polymer. A molecular weight of the binder falling within a specified range helps improve the adhesion.

In this application, the constituent monomers of the polyacrylate polymer include the first polymeric flexible monomer, the second polymeric polar monomer, and the third polymeric molecular weight regulating monomer, and the polymer is obtained through a crosslinking reaction of the three monomers. Molecular weight and glass transition temperature of the polymer can be controlled to improve the adhesion performance of the binder.

A modified polymer has a lower softening point than a pure polyvinylidene fluoride polymer, so that the binder can fully penetrate into gaps between positive and negative electrode plates and the separator during pre-cold pressing of a cell. To be specific, gaps are present between the electrode plates and the separator, and the binder penetrates into the gaps such that the electrode plates and the separator are effectively connected, and it is difficult for the binder to come out of the gaps. During swelling of the electrode plates, the binder has toughness, and therefore the binder can still effectively connect the two during swelling. This can make full use of the adhesion performance of the binder, and in turn helps improve kinetic performance and large-clamp cycling performance of a battery.

The softening point refers to a temperature at which a substance softens. The softening point is related to both the structure and molecular weight of a high-molecular polymer. In this application, the molecular weight of the polymer is regulated using the third polymeric molecular weight regulating monomer so as to improve the softening point of the polymer.

The large-clamp cycling performance is a cycling functional testing performance for cells. During the testing process, a cell is placed in a clamp, and a certain force is applied to the clamp to compress the cell. The cell swells after fully charged, and under the compression of both a clamping force and a swelling force, the cell deforms. This test is conducted to evaluate shape retention performance and compression resistance of the cell. With use of the binder in this solution, the good adhesion performance alleviates swelling of the cell, resulting in good shape retention of the cell. The cell using the binder in this application exhibits good performance retention under the large-clamp testing conditions, indicating that the cell obtained using the binder in this solution features good shape retention. After the cell is assembled into a battery, since the cell is less likely to deform, space for mounting the cell in the battery can be reduced, allowing the battery to be made smaller. This is because if the cell is prone to deformation, such compression would compress a structure near the cell. To avoid this phenomenon, more space is required for accommodating the deformed cell, to be specific, space needs to be reserved in the battery to accommodate the deformed part of the cell, and thus more space inside the battery is occupied.

In addition, good large-clamp cycling performance of the cell also indicates good cycling performance of the cell. For example, after the cell swells, the gaps between the electrode plates and the separator become larger, and the path of lithium ions passing through the positive and negative electrodes becomes longer, resulting in worse cycling.

In some embodiments, a molar ratio of the first polymeric flexible monomer, the second polymeric polar monomer, and the third polymeric molecular weight regulating monomer is 1:(0.01-0.8):(0.01-0.15), optionally 1:(0.05-0.7): (0.05-0.12).

For a molar ratio test method, during preparation of the binder, mole numbers of the monomers put during reaction for preparation of a shell layer structure are recorded, where the mole number of the monomer is equal to mass of the monomer divided by a molecular weight of the monomer, the mole number of the first polymeric flexible monomer is defined as a, the mole number of the second polymeric polar monomer is defined as b, the mole number of the third polymeric molecular weight regulating monomer is defined as c, and then the molar ratio of the first polymeric flexible monomer, the second polymeric polar monomer, and the third polymeric molecular weight regulating monomer is a:b:c.

When the molar ratio of the first polymeric flexible monomer, the second polymeric polar monomer, and the third polymeric molecular weight regulating monomer is 1:(0.01-0.8):(0.01-0.15), the binder features good adhesion. For example, the molar ratio may be 1:0.01:0.01, 1:0.1:0.01, 1:0.4:0.01, 1:0.8:0.01, 1:0.01:0.05, 1:0.01:0.1, 1:0.01:0.15, 1:0.1:0.01, 1:0.1:0.05, 1:0.1:0.15, 1:0.4:0.01, 1:0.4:0.05, 1:0.4:0.15, 1:0.8:0.01, 1:0.8:0.05, 1:0.8:0.15, and the like, which is not specifically limited.

In some embodiments, the molar ratio of the first polymeric flexible monomer, the second polymeric polar monomer, and the third polymeric molecular weight regulating monomer is 1:(0.05-0.7):(0.05-0.12).

When the molar ratio of the first polymeric flexible monomer, the second polymeric polar monomer, and the third polymeric molecular weight regulating monomer is 1:(0.05-0.7):(0.05-0.12), the binder features good adhesion. In 1:(0.05-0.7):(0.05-0.12), the values include minimum and maximum values of the range and each value between such minimum and maximum values. Specific examples include but are not limited to point values in the embodiments and 1:0.05:0.05, 1:0.1:0.05, 1:0.4:0.05, 1:0.7:0.05, 1:0.1:0.05, 1:0.1:0.1, 1:0.1:0.12, and the like.

In some embodiments, the first polymeric flexible monomer contains an ester bond (—COOR (R is generally another non-H group such as an alkyl group)) in structure, the second polymeric polar monomer contains a cyano group (—C≡N) in structure, and the third polymeric molecular weight regulating monomer contains an amide bond (—CO—NH—).

The ester bond can improve the flexibility of a molecular chain, the cyano group can improve the polarity of the monomer, and the amide bond has polarity and can easily form a hydrogen bond, thereby improving adhesion. The first polymeric flexible monomer contains the ester bond in structure, the second polymeric polar monomer contains the cyano group in structure, and the third polymeric molecular weight regulating monomer contains the amide bond, so that with the polymer obtained by polymerization of the above three monomers, the molecular weight and glass transition temperature of the polymer can be controlled to improve the adhesion performance of the binder.

In some embodiments, the first polymeric flexible monomer is an acrylate monomer, the second polymeric polar monomer is an acrylonitrile monomer, and the third polymeric molecular weight regulating monomer is an acrylamide monomer.

The acrylate monomer can improve swelling resistance of the polymer, and as a flexible monomer chain segment in a molecular chain segment, can regulate the glass transition temperature of the polymer and improve toughness of the binder when the binder is applied, thereby helping achieve good adhesion.

The acrylonitrile monomer has a cyano group with strong polarity, conducive to improving ionic conductivity and improving adhesion.

The acrylamide monomer has a function of regulating the molecular weight and also features good adhesion.

With the polymer prepared using the above three types of monomers, the molecular weight and glass transition temperature of the polymer can be controlled to improve the adhesion performance of the binder.

In some embodiments, the acrylate monomer includes at least one of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate; and/or the acrylonitrile monomer includes at least one of acrylonitrile and methacrylonitrile; and/or the acrylamide monomer includes at least one of acrylamide, N-methylolacrylamide, and N-butoxymethylacrylamide.

Based on the fact that the acrylate monomer helps improve the adhesion of the binder, the acrylate monomer may include at least one of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate. To be specific, the constituent monomers of the polyacrylate polymer may include one of the above acrylate monomers, or may include more than one of the above acrylate monomers, which is not specifically limited.

Based on the fact that the acrylonitrile monomer helps improve the adhesion of the binder, the acrylonitrile monomer includes at least one of acrylonitrile and methacrylonitrile. To be specific, the constituent monomers of the polyacrylate polymer may include one of the above acrylonitrile monomers or may include more than one of the above acrylonitrile monomers, which is not specifically limited.

Based on the fact that the acrylamide monomer helps improve the adhesion of the binder, the acrylamide monomer includes at least one of acrylamide, N-methylolacrylamide, and N-butoxymethylacrylamide. To be specific, the constituent monomers of the polyacrylate polymer may include one of the above acrylamide monomers, or may include more than one of the above acrylamide monomers, which is not specifically limited.

In some embodiments, the polyvinylidene fluoride polymer includes at least one of vinylidene fluoride polymer, vinylidene fluoride-hexafluoropropylene copolymer, vinylidene fluoride-pentafluoropropylene copolymer, vinylidene fluoride-tetrafluoropropylene copolymer, vinylidene fluoride-trifluoropropylene copolymer, vinylidene fluoride-perfluorobuttene copolymer, vinylidene fluoride-tetrafluoroethylene copolymer, vinylidene fluoride-trifluoroethylene copolymer, vinylidene fluoride-trifluorochloroethylene copolymer, or vinylidene fluoride-fluoroethylene copolymer.

In addition to good chemical resistance and corrosion resistance, the polyvinylidene fluoride polymer also has special properties such as high temperature resistance, oxidization resistance, weather resistance, and radiation resistance, features piezoelectricity, dielectricity, and thermoelectric property, and is commonly used in lithium-ion battery separators.

The polyvinylidene fluoride polymer used in this application includes at least one of vinylidene fluoride polymer, vinylidene fluoride-hexafluoropropylene copolymer, vinylidene fluoride-pentafluoropropylene copolymer, vinylidene fluoride-tetrafluoropropylene copolymer, vinylidene fluoride-trifluoropropylene copolymer, vinylidene fluoride-perfluorobuttene copolymer, vinylidene fluoride-tetrafluoroethylene copolymer, vinylidene fluoride-trifluoroethylene copolymer, vinylidene fluoride-trifluorochloroethylene copolymer, or vinylidene fluoride-fluoroethylene copolymer. To be specific, the polyvinylidene fluoride polymer may include one of the above polyvinylidene fluoride polymers or may include more than one of the above polyvinylidene fluoride polymers, which is not specifically limited.

As shown in FIG. 1, this application further provides a preparation method of binder. The method includes the following steps:

adding water, an emulsifier, an initiator, and constituent monomers of a polyvinylidene fluoride polymer into a reaction vessel, stirring, and heating under a reaction pressure for polymerization reaction, to obtain a seed emulsion for later use;

mixing and stirring water, an emulsifier, and constituent monomers of a polyacrylate polymer to obtain a shell-layer monomer pre-emulsion for later use; and putting the shell-layer monomer pre-emulsion, an initiator, and water into the seed emulsion, and performing stirring and heating for reaction, to obtain a core-shell-structured binder.

In this application, the seed emulsion of the polyvinylidene fluoride polymer of the core layer is obtained first through emulsion polymerization, and then the polyacrylate polymer of the shell layer is prepared on the surface of the core layer structure through emulsion polymerization, and ultimately a core-shell-structured binder is formed.

Emulsion polymerization: emulsion polymerization is that monomers are dispersed in water through an emulsifier and mechanical stirring to form an emulsion, and then an initiator is added to initiate monomer polymerization.

The core-shell structure is formed by a core at the center and a shell for encapsulation at the outer layer.

Seed emulsion: firstly, a seed latex is prepared from a small quantity of monomers using a common emulsion polymerization method; and subsequently, a small amount of seed latex is added into a formal emulsion polymerization composition, and polymerization reaction is performed using latex particles of the seed emulsion as cores to make the latex particles grow continuously.

Pre-emulsion refers to a solution obtained through pre-emulsification of monomers, and emulsification is an effect of dispersing one liquid to uniformity in another liquid in the form of tiny droplets, where the two liquids are immiscible with each other, and water, an emulsifier, and constituent monomers of a polyacrylate polymer are mixed and stirred such that the constituent monomers of the polyacrylate polymer are dispersed in water under the action of the emulsifier.

Emulsifier: emulsifier is a type of substance that can convert mutually immiscible oil and water into an emulsion that is difficult to stratify. The emulsifier is generally a surfactant featuring both properties of some hydrophilic polar groups and hydrophobic (lipophilic) non-polar groups.

Initiator: initiator is a substance that can initiate a polymerization reaction of monomers. For example, a free radical initiator refers to a type of compound that is likely to be decomposed by heat into free radicals (that are, primary radicals), and can be used to initiate free radical polymerization and co-polymerization reactions of alkene and diene monomers.

For ease of description, in the foregoing preparation method of binder, the process of the foregoing preparation method is defined in paragraphs as step 1, step 2, and step 3 according to the writing order of the paragraphs. It can be understood by persons skilled in the art that in the foregoing method in specific embodiments, the writing order of the steps does not imply a strict order of execution or constitutes any limitation on the process of implementation, and a specific execution order of the steps should be determined based on their functions and possible internal logics.

In step 1, water, an emulsifier, an initiator, and constituent monomers of a polyvinylidene fluoride polymer are mixed and stirred, and the water and emulsifier form an emulsion after stirred and dispersed. To be specific, micelles are formed by the emulsifier in the aqueous phase, most of the micelles are solubilized with monomers, under a certain pressure, the monomers enter a reaction system of the micelles, and under a condition of a temperature rise, the initiator initiates polymerization of the monomers inside the micelles to obtain a core-layer seed emulsion. In step 2, water, an emulsifier, and constituent monomers of a polyacrylate polymer are mixed and stirred, and the emulsifier and water are likewise dispersed to form an emulsion, and the constituent monomers of the polyacrylate polymer enter the micelles to obtain a shell-layer monomer pre-emulsion for later use. In step 3, an initiator, water, and the shell-layer monomer pre-emulsion obtained in step 2 are put into the seed emulsion obtained in step 1, and stirred and heated for reaction, so that the constituent monomers of the polyacrylate polymer form a polymer on the surface of the core layer, and the polyacrylate polymer is attached to the surface of the polyvinylidene fluoride polymer core layer structure, so as to obtain a core-shell-structured binder. In step 1, the dispersion polymerization and nucleation mechanism of polyvinylidene fluoride belongs to the oligomer nucleation mechanism, and under a same conversion rate, the amount of the initiator or emulsifier can be increased to obtain a smaller particle size of polyvinylidene fluoride latex particles.

In step 1, the constituent monomers of the polyvinylidene fluoride polymer are gaseous and are difficult to enter the micelles under an atmospheric pressure. Therefore, the gaseous monomers are pressurized to enter the micelles, such that the reaction can proceed effectively.

The initiators in step 1 and step 3 need to be converted at a specified temperature to have the function of initiating monomer polymerization. Therefore, step 1 and step 3 are both performed under a heating condition.

In addition, mass of the water in step 3 being greater than or equal to 0 means that water may be either added or not added in step 3. It can be understood that when the water added in step 1 and step 2 is sufficient, to be specific, when the water added in step 1 and step 2 allows a solid content after the reactions in step 1, step 2 and step 3 to be within a preset range, water may be not added in step 3; and when the water added in step 1 and 2 is insufficient, a certain amount of water needs to be added in step 3 to regulate the solid content of the system, so as to prevent increase in viscosity after the reaction and decrease in reaction rate.

It can be understood that a stirring speed in step 1, step 2, and step 3 is 1000 r/min-5000 r/min, for example, it may be 1000 r/min, 2000 r/min, 3000 r/min, 4000 r/min, or 5000 r/min, which is not specifically limited. In addition, stirring may be performed for 60 min±20 min to obtain a prepolymer emulsified to uniformity under such stirring conditions for later use.

In some embodiments, a mass ratio of the constituent monomers of the polyvinylidene fluoride polymer to the constituent monomers of the polyacrylate polymer is (2-100):1, optionally (10-80):1.

In order to obtain the raspberry-shaped core-shell structure mentioned above, the core layer structure has a larger mass than the shell layer structure to ensure that the shell layer structure cannot totally encapsulate the surface of the core layer structure, such that a surface structure of the core layer structure is partially exposed, thereby obtaining the above raspberry-shaped core-shell structure. The core layer structure having a larger mass than the shell layer structure may mean that a mass ratio of the core layer structure to the shell layer structure is (2-100):1, for example, the mass ratio may be 2:1, 10:1, 20:1, 30:1, 40:1, 50:1, 60:1, 70:1, 80:1, 90:1, 100:1, and 100:1, which is not specifically limited.

In some embodiments, the step of putting water, an emulsifier, an initiator, and constituent monomers of a polyvinylidene fluoride polymer into the reaction vessel, stirring, and heating under a reaction pressure for polymerization reaction, to obtain a seed emulsion for later use includes the following steps: removing oxygen from the reaction vessel, putting the water, emulsifier, initiator, and constituent monomers of the polyvinylidene fluoride polymer into the reaction vessel, stirring, and heating to 75° C.±10° C. under a reaction pressure for polymerization reaction, to obtain a seed emulsion for later use.

With consideration that in a polymerization process, oxygen, as a polymerization inhibitor, affects the polymerization reaction, it is necessary to remove oxygen from the reaction vessel. For example, oxygen in the reaction vessel can be removed before step 1 is performed. For example, nitrogen can be introduced into the reaction vessel to replace oxygen. After oxygen is removed, the emulsifier, initiator, and constituent monomers of the polyvinylidene fluoride polymer are put into the reaction vessel, stirred, and heated to 75° C.±10° C. under a reaction pressure for polymerization reaction, to obtain a seed emulsion for later use.

In some embodiments, the steps of removing oxygen from the reaction vessel, putting the water, emulsifier, initiator, and constituent monomers of the polyvinylidene fluoride polymer into the reaction vessel, stirring, and heating to 75° C.±10° C. under a reaction pressure for polymerization reaction, to obtain a seed emulsion for later use include the following steps: putting the water, emulsifier, and initiator into the reaction vessel, stirring, removing oxygen from the reaction vessel, then putting the constituent monomers of the polyvinylidene fluoride polymer into the reaction vessel, stirring, and heating to 75° C.±10° C. under the reaction pressure for polymerization reaction, to obtain a seed emulsion for later use.

With consideration that the water, emulsifier, and initiator are first put into the reaction vessel and stirred, then the constituent monomers of the polyvinylidene fluoride polymer are added, making the monomers be emulsified more fully. Therefore, the steps of preparing the seed emulsion may include: putting the water, emulsifier, and initiator into the reaction vessel, stirring, removing oxygen from the reaction vessel, then putting the constituent monomers of the polyvinylidene fluoride polymer into the reaction vessel, and heating to 75° C.±10° C. under a reaction pressure for polymerization reaction, to obtain a seed emulsion for later use.

In some embodiments, the steps of removing oxygen from the reaction vessel, putting the water, emulsifier, initiator, and constituent monomers of the polyvinylidene fluoride polymer into the reaction vessel, stirring, and heating to 75° C.±10° C. under a reaction pressure for polymerization reaction, to obtain a seed emulsion for later use include the following steps: removing oxygen from the reaction vessel, putting the water, emulsifier, initiator, and constituent monomers of the polyvinylidene fluoride polymer into the reaction vessel, controlling a reaction pressure in the reaction vessel at 3.0 MPa-4 MPa, stirring, and heating to 75° C.±10° C. for polymerization reaction; and when the pressure in the reaction vessel decreases to 3.0 MPa, continuing to put the constituent monomers of the polyvinylidene fluoride polymer into the reaction vessel, and controlling the pressure in the reaction vessel at 3.0 MPa-4 MPa until the reaction ends, to obtain a seed emulsion for later use.

With consideration that the constituent monomers of the polyvinylidene fluoride polymer are gases, the monomers in the reaction vessel are continuously consumed during the continuous polymerization reaction, resulting in continuous decrease of the pressure in the reaction vessel; and when the pressure decreases to a certain value, it is difficult for the monomers to enter a solution system to reach the micelles for reaction. Therefore, it is necessary to control the pressure in the reaction vessel within a certain range of values to ensure that the monomers can effectively participate in the reaction. Therefore, the steps of preparing the seed emulsion may include: removing oxygen from the reaction vessel, putting the water, emulsifier, initiator, and constituent monomers of the polyvinylidene fluoride polymer into the reaction vessel, controlling a reaction pressure in the reaction vessel at 3.0 MPa-4 MPa, stirring, and heating to 75° C.±10° C. for polymerization reaction; and when the pressure in the reaction vessel decreases to 3.0 MPa, continuing to put the constituent monomers of the polyvinylidene fluoride polymer into the reaction vessel, and controlling the pressure in the reaction vessel at 3.0 MPa-4 MPa until the reaction ends, to obtain a seed emulsion for later use.

With consideration that an excessively low pressure leads to a lower reaction rate and an excessively high pressure leads to consumption of more energy as well as acceleration of reaction, the reaction pressure is controlled within a range of 3.0 MPa-4 MPa, for example, the reaction pressure may be 3.0 MPa, 3.5 MPa, or 4 MPa, which is not specifically limited.

In some embodiments, the step of adding the shell-layer monomer pre-emulsion, initiator, and water into the seed emulsion, stirring, and heating for reaction to obtain a binder includes the following steps: putting water into the seed emulsion, stirring, then putting the shell-layer monomer pre-emulsion and initiator into the seed emulsion at a speed of 10 mL/min-500 mL/min, heating to 90° C.±10° C., and stirring for reaction for 30 min±20 min to obtain the binder.

In order to avoid explosive polymerization caused by putting the shell-layer monomer pre-emulsion and initiator into the reaction vessel all at once, it is necessary to put the shell-layer monomer pre-emulsion and initiator into the reaction vessel at a specified dropwise addition speed, for example, at a dropwise addition speed of 10 mL/min, 50 mL/min, 100 mL/min, 150 mL/min, 200 mL/min, 250 mL/min, 300 mL/min, 350 mL/min, 400 mL/min, 450 mL/min, or 500 mL/min, which is not specifically limited. In addition, for effective proceeding of the reaction, heating is performed to increase the temperature to 90° C.±10° C. during the reaction to allow the initiator to initiate a polymerization reaction, and stirring is performed for reaction for 30 min±20 min to obtain the binder.

In some embodiments, the step of putting water into the seed emulsion, stirring, then putting the shell-layer monomer pre-emulsion and initiator into the seed emulsion at a speed of 10 mL/min-500 mL/min, heating to 90° C.±10° C., and stirring for reaction for 30 min±20 min to obtain the binder includes the following steps: putting the water into the seed emulsion, stirring, then putting the shell-layer monomer pre-emulsion and initiator into the seed emulsion at a speed of 10 mL/min-500 mL/min, heating to 90° C.±10° C., stirring for reaction for 30 min±20 min, cooling, and then regulating pH to be 6-8 to obtain the binder.

In the core-shell-structured binder prepared, particles are prone to agglomeration, leading to sedimentation and hindering use and storage of the binder. Therefore, in order to avoid agglomeration and sedimentation of the core-shell-structured binder, a pH regulating reagent is added to the prepared core-shell-structured binder to make the particles in the core-shell structure evenly dispersed and the system stable. A pH of the binder is within a range of pH 6-8, for example, it may be pH 6, pH 7, or pH 8, which is not specifically limited. It can be understood that the specific pH regulating reagent used is not limited in this application, for example, ammonium hydroxide may be used to regulate the pH.

In some embodiments, in step 1, the mass of the emulsifier accounts for 0.1%-5% of the mass of the constituent monomers of the polyvinylidene fluoride polymer; and the mass of the initiator accounts for 0.15%-1% of the mass of the constituent monomers of the polyvinylidene fluoride polymer.

The amount of the emulsifier needs to be moderate. The emulsifier is an important component for emulsion polymerization because the emulsifier can convert mutually immiscible oil (monomer)-water into a quite stable emulsion that is difficult to stratify. In an emulsion polymerization system, the emulsifier mainly has three functions: the first is to reduce surface tension and disperse monomers into tiny droplets; the second is to form a protective layer on the surface of the droplets or particles to prevent coalescence and keep the emulsion stable; and the third is to form micelles to solubilize the monomers. The size and number of micelles depend on the amount of the emulsifier, so the amount of the emulsifier directly affects performance of a product. In step 1, the mass of the emulsifier accounts for 0.1%-5% of the mass of the constituent monomers of the polyvinylidene fluoride polymer, for example, 0.1%, 0.15%, 0.2%, 0.25%, 0.3%, 0.35%, 0.4%, 0.45%, or 5%, which is not specifically limited. The amount of the initiator has great influence on speed of polymerization and performance of a product. Increased amount of the initiator leads to increased speed of polymerization, which leads to unstable polymerization reaction, decreased molecular weight and product yield, and deteriorated performance of the polymer. In addition, insufficient initiator also leads to difficulty in polymerization reaction. Therefore, in step 1, the mass of the initiator accounts for 0.15%-1% of the mass of the constituent monomers of the polyvinylidene fluoride polymer, for example, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1%, which is not specifically limited.

In some embodiments, in step 1, the emulsifier includes a polyfluoride compound, and the initiator includes an organic peroxide initiator and an inorganic peroxide initiator.

The emulsifier refers to a substance that can make water into emulsion state. A specific type and structure of the emulsifier are not limited in this application, and any substance that can provide the above function and has no influence on a reaction system can be used in this application. For example, in step 1, the emulsifier used includes a polyfluoride compound. The initiator refers to a substance that can initiate a polymerization reaction of monomers. A specific type and structure of the initiator are not limited in this application, and any substance that can provide the above function and has no influence on a reaction system can be used in this application. For example, in step 1, the initiator includes an organic peroxide initiator and an inorganic peroxide initiator. The initiator used is preferably an organic peroxide initiator, and polyvinylidene fluoride prepared using such initiator has high stability.

In some embodiments, in step 1, the emulsifier includes at least one of ammonium perfluoropolyether carboxylate, sodium perfluoropolyether carboxylate, and potassium perfluoropolyether carboxylate; and the initiator includes at least one of benzoyl peroxide, di-tert-butyl peroxide, diisopropyl peroxydicarbonate, dipropyl peroxydicarbonate, diethyl peroxydicarbonate, and persulfate.

The emulsifier refers to a substance that can make water into emulsion state. For example, the emulsifier used in step 1 includes at least one of ammonium perfluoropolyether carboxylate, sodium perfluoropolyether carboxylate, and potassium perfluoropolyether carboxylate. To be specific, the emulsifier may be one of the above substances, for example, may be sodium perfluoropolyether carboxylate. The emulsifier can reduce surface tension between droplets and prevent coalescence of monomer liquid or latex particles. In addition, the emulsifier may alternatively be a mixture of more than one of the above substances. The initiator refers to a substance that can initiate a polymerization reaction of monomers. For example, the initiator used in step 1 includes at least one of benzoyl peroxide, di-tert-butyl peroxide, di-isopropyl peroxydicarbonate, dipropyl peroxydicarbonate, diethyl peroxydicarbonate, and persulfate. To be specific, the initiator used may be one of the above substances, for example, the initiator is preferably di-isopropyl peroxydicarbonate or may be a mixture of more than one of the above substances.

In some embodiments, the constituent monomers of the polyvinylidene fluoride polymer include vinylidene fluoride, or the constituent monomers of the polyvinylidene fluoride polymer include vinylidene fluoride, and at least one of vinylidene fluoride, hexafluoropropylene, pentafluoropropylene, tetrafluoropropylene, trifluoropropylene, perfluorobutene, tetrafluoroethylene, trifluoroethylene, chlorotrifluoroethylene, and fluoroethylene.

The polyvinylidene fluoride polymer refers to a polymer with vinylidene fluoride as monomers. In addition to vinylidene fluoride, the monomers of the polyvinylidene fluoride polymer further include at least one of hexafluoropropylene, pentafluoropropylene, tetrafluoropropylene, trifluoropropylene, perfluorobutene, tetrafluoroethylene, trifluoroethylene, trifluorochloroethylene, and fluoroethylene. To be specific, the polyvinylidene fluoride polymer may be a homopolymer of vinylidene fluoride or a copolymer of vinylidene fluoride and other fluorine-containing ethylene, which is not specifically limited.

In some embodiments, in step 1, the step of putting water, an emulsifier, an initiator, and constituent monomers of a polyvinylidene fluoride polymer into the reaction vessel, stirring, and heating under a reaction pressure for polymerization reaction, to obtain a seed emulsion for later use includes the following steps: putting the water, a chain transfer agent, the emulsifier, the initiator, and the constituent monomers of the polyvinylidene fluoride polymer into the reaction vessel, stirring, and heating under a reaction pressure for polymerization reaction, to obtain a seed emulsion for later use.

The chain transfer agent is used for controlling molecular weight distribution of a product in the polymerization reaction. Chain transfer refers to a process in which an active center in a chain polymerization reaction is transferred from a propagating chain to another molecule. The number of the active center is unchanged, and a propagating macromolecular chain becomes inactive to form stable macromolecules, and thus molecular weight of the product is reduced.

In order to effectively control molecular weight of a reaction product, in step 1, the water, chain transfer agent, emulsifier, initiator, and constituent monomers of the polyvinylidene fluoride polymer are added into the reaction vessel, stirred, and heated under a reaction pressure for polymerization reaction, to obtain a seed emulsion for later use. During the polymerization reaction, the chain transfer agent is added for preparing a seed emulsion of a polyvinylidene fluoride polymer with appropriate molecular weight.

In some embodiments, mass of the chain transfer agent accounts for 1%-3% of mass of the constituent monomers of the polyvinylidene fluoride polymer; and the chain transfer agent includes alcohol compounds, ester compounds, ketone compounds, and haloalkanes.

The mass of the chain transfer agent accounts for 1%-3% of mass of the constituent monomers of the polyvinylidene fluoride polymer, for example, may be 1%, 1.5%, 2%, 2.5%, or 3%, which is not specifically limited. The chain transfer agent includes alcohol compounds, ester compounds, ketone compounds, and haloalkanes; and the chain transfer agent is not limited to any specific type.

In some embodiments, in step 2, the mass of the emulsifier accounts for 0.15%-5% of the mass of the constituent monomers of the polyacrylate polymer; and in step 3, the mass of the initiator accounts for 0.15%-1% of the mass of the constituent monomers of the polyacrylate polymer.

The amount of the emulsifier needs to be moderate. The emulsifier is an important component for emulsion polymerization because the emulsifier can convert mutually immiscible oil (monomer)-water into a quite stable emulsion that is difficult to stratify. In an emulsion polymerization system, the emulsifier mainly has three functions: the first is to reduce surface tension and disperse monomers into tiny droplets; the second is to form a protective layer on the surface of the droplets or particles to prevent coalescence and keep the emulsion stable; and the third is to form micelles to solubilize the monomers. The size and number of micelles depend on the amount of the emulsifier, so the amount of the emulsifier directly affects performance of a product. In step 2, the mass of the emulsifier accounts for 0.15%-5% of the mass of the constituent monomers of the polyacrylate polymer, for example, 0.15%, 0.2%, 0.25%, 0.3%, 0.35%, 0.4%, 0.45%, or 5%, which is not specifically limited. The amount of the initiator has great influence on speed of polymerization and performance of a product. Increased amount of the initiator leads to increased speed of polymerization, which leads to unstable polymerization reaction, decreased molecular weight and product yield, and deteriorated performance of the polymer. In addition, insufficient initiator also leads to difficulty in polymerization reaction. Therefore, in step 3, the mass of the initiator accounts for 0.15%-1% of the mass of the constituent monomers of the polyacrylate polymer, for example, may be 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1%, which is not specifically limited.

In some embodiments, in step 2, the emulsifier includes an anionic emulsifier, and in step 3, the initiator includes at least one of an azo initiator, an organic peroxide initiator, and an inorganic peroxide initiator.

The anionic emulsifier is a surface active substance, and when dissolved in water, has its active part that tends to dissociate into negatively charged ions, characterized by having a large organic anion that can react with alkali to generate a salt. In terms of structural difference of the negatively charged ion parts, the salt can be divided into three types: carboxylate type, sulfonate type, and sulfate type.

The azo initiator refers to a type of free radical initiator containing a nitrogen-nitrogen double bond in a molecular structure.

The peroxide initiator refers to a type of compound containing peroxy (—O—O—), in which the —O—O— bond breaks and splits into two corresponding free radicals after heated, thereby initiating monomer polymerization. Such type of compound is known as peroxide initiators. The peroxide initiators are divided into two types: inorganic peroxide initiator and organic peroxide initiator. The inorganic peroxide initiator includes hydrogen peroxide, ammonium persulfate, potassium persulfate, or the like; and the organic peroxide initiator includes benzoyl peroxide, tertbutyl benzoyl peroxide, methyl ethyl ketone peroxide, and the like.

The emulsifier refers to a substance that can make water into emulsion state. A specific type and structure of the emulsifier is not limited in this application, and any substance that can provide the above function and has no influence on a reaction system can be applied in this application. For example, in step 2, the emulsifier used includes an anionic emulsifier. The initiator refers to a substance that can initiate a polymerization reaction of monomers. A specific type and structure of the initiator is not limited in this application, and any substance that can provide the above function and has no influence on a reaction system can be applied in this application. For example, in step 3, the initiator includes at least one of an azo initiator, an organic peroxide initiator, and an inorganic peroxide initiator.

In some embodiments, in step 2, the emulsifier includes at least one of sodium lauryl sulfate, sodium dodecyl sulfonate, sodium dodecyl benzene sulfonate, sodium styrene sulfonate, and sodium vinyl sulfonate; and in step 3, the initiator includes at least one of azobisisobutyronitrile, azobisisheptanenitrile, isopropyl benzene hydrogen peroxide, tert-butyl hydrogen peroxide, benzoyl peroxide, ammonium persulfate, potassium persulfate, sodium persulfate, and hydrogen peroxide.

The emulsifier refers to a substance that can make water into emulsion state. For example, the emulsifier used in step 2 includes at least one of sodium lauryl sulfate, sodium dodecyl sulfonate, sodium dodecyl benzene sulfonate, sodium styrene sulfonate, and sodium vinyl sulfonate. To be specific, the emulsifier used may be one of the above substances, for example, the emulsifier is preferably sodium dodecyl benzene sulfonate or may be a mixture of more than one of the above substances. The initiator refers to a substance that can initiate a polymerization reaction of monomers. For example, the initiator used in step 3 includes at least one of azobisisobutyronitrile, azobisisheptanenitrile, isopropyl benzene hydrogen peroxide, tert-butyl hydrogen peroxide, benzoyl peroxide, ammonium persulfate, potassium persulfate, sodium persulfate, and hydrogen peroxide. To be specific, the initiator used may be one of the above substances, for example, the initiator is preferably potassium persulfate or may be a mixture of more than one of the above substances.

In some embodiments, a total mass of the water in step 1, the water in step 2, and the water in step 3 accounts for 45%-60% of mass of all the materials in steps 1, 2, and 3; and the water in steps 1, 2, and 3 is deionized water.

As a dispersion medium, water has functions such as mass transfer and temperature control. If the amount of water is excessively small or excessively large, it is difficult to control viscosity of the reaction system to fall within a reasonable range. A total mass of the water in step 1, the water in step 2, and the water in step 3 accounts for 45%-60% of the mass of all the materials in steps 1, 2, and 3, for example, 45%, 50%, 55%, or 60%, which is not specifically limited. In addition, the water in steps 1, 2, and 3 is deionized water, so as to avoid impurities in water affecting the polymerization reaction.

An embodiment of this application further provides a separator, where the separator includes the foregoing binder or a binder prepared using the foregoing preparation method of binder. The binder has adopted all the technical solutions of all the foregoing embodiments, and therefore has at least all the beneficial effects brought by the technical solutions of the foregoing embodiments. Details are not described herein again.

The separator being coated with the foregoing binder can improve adhesion performance between an electrode plate and the binder and alleviate the opening issue in the existing pre-cold pressing process for cells.

An embodiment of this application further provides an electrode assembly, where the electrode assembly includes the foregoing separator. The separator has adopted all the technical solutions of all the foregoing embodiments, and therefore has at least all the beneficial effects brought by the technical solutions of the foregoing embodiments. Details are not described herein again.

The electrode assembly includes a positive electrode plate, a negative electrode plate, and a separator. The binder is applied on the separator to adhere the electrode plates and the separator together, so as to alleviate the opening issue of electrode plates and separators.

An embodiment of this application further provides a battery cell, where the battery cell includes the foregoing electrode assembly. The electrode assembly has adopted all the technical solutions of all the foregoing embodiments, and therefore has at least all the beneficial effects brought by the technical solutions of the foregoing embodiments. Details are not described herein again.

The foregoing electrode assembly being applied to the battery cell can improve large-clamp cycling performance of the battery cell.

An embodiment of this application further provides a battery, where the battery includes the foregoing battery cell. The battery cell has adopted all the technical solutions of all the foregoing embodiments, and therefore has at least all the beneficial effects brought by the technical solutions of the foregoing embodiments. Details are not described herein again.

The battery includes a battery module and a battery pack.

An embodiment of this application further provides an electric apparatus, where the electric apparatus includes the foregoing battery cell or battery. The battery cell or battery has adopted all the technical solutions of all the foregoing embodiments, and therefore has at least all the beneficial effects brought by the technical solutions of the foregoing embodiments. Details are not described herein again.

In addition, the following describes an electrode assembly, a battery cell, a battery, and an electric apparatus in this application with appropriate reference to the accompanying drawings.

An embodiment of this application provides an electrode assembly.

Generally, the electrode assembly includes a positive electrode plate, a negative electrode plate, an electrolyte, and a separator. During charging and discharging of a battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between the positive and negative electrodes and to allow the ions to pass through. The separator is the foregoing separator provided in this application.

The positive electrode plate includes a positive electrode current collector and a positive electrode film layer provided on at least one surface of the positive electrode current collector.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, when the electrode assembly is used for a lithium-ion battery, a positive electrode active material may be a well-known positive electrode active material used for lithium-ion batteries in the art. For example, the positive electrode active material may include at least one of the following materials: olivine-structured lithium-containing phosphate, lithium transition metal oxide, and respective modified compounds thereof. However, this application is not limited to these materials, and may alternatively use other conventional materials that can be used as positive electrode active materials for batteries. One of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}CO_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), and $LiNi_{0.8}Co_{0.1}Mn_{0.1}O_2$ (NCM811 for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for batteries in the art. For example, the negative electrode active material may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, but may use other conventional materials that can be used as negative electrode active materials for batteries instead. One type of these negative electrode active materials may be used alone, or two or more types may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer further optionally includes other additives such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

The electrolyte conducts ions between the positive electrode plate and the negative electrode plate. The electrolyte is not specifically limited to any particular type in this application, and may be selected as required.

In some embodiments, the electrolyte is a liquid electrolyte. The liquid electrolyte includes an electrolytic salt and a solvent.

In some embodiments, the electrolytic salt may be selected from at least one of lithium hexafluorophosphate, lithium tetrafluoroborate, lithium perchlorate, lithium hexafluoroborate, lithium bis(fluorosulfonyl)imide, lithium bis-trifluoromethanesulfonimide, lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive or a positive electrode film-forming additive, or may include an additive capable of improving some performance of the battery, for example, an additive for improving overcharge performance of the battery, or an additive for improving high-temperature or low-temperature performance of the battery.

In some embodiments, the electrode assembly further includes a separator. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into the electrode assembly through winding or lamination.

In some embodiments, the electrode assembly may include an outer package. The outer package may be used for packaging the electrode assembly and the electrolyte.

In some embodiments, the outer package of the electrode assembly may be a hard shell, for example, a hard plastic shell, an aluminum shell, or a steel shell. The outer package of the electrode assembly may alternatively be a soft pack, for example, a soft pouch. A material of the soft pack may be plastic. As the plastic, polypropylene, polybutylene terephthalate, polybutylene succinate, and the like may be listed.

The electrode assembly is not limited to any specific shape in this application, and the electrode assembly may be cylindrical, rectangular, or of any other shapes. For example, FIG. 5 shows an electrode assembly 5 of a rectangular structure as an example.

In some embodiments, referring to FIG. 6, the outer package may include a housing 51 and a cover plate 53. The housing 51 may include a base plate and a side plate connected onto the base plate, where the base plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. The electrode assembly 5 may include one or more electrode assemblies 52, and persons skilled in the art may make choices according to actual requirements.

In some embodiments, the electrode assemblies may be assembled into a battery module, and the battery module may include one or more electrode assemblies. The specific quantity may be chosen by persons skilled in the art according to use and capacity of the battery module.

Figure 7:
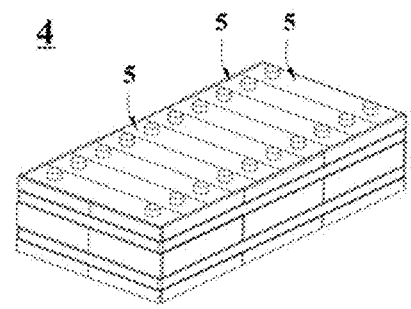
FIG. 7 is a schematic diagram of a battery module according to an embodiment of this application.

FIG. 7 shows a battery module 4 as an example. Referring to FIG. 7, in the battery module 4, a plurality of electrode assemblies 5 may be sequentially arranged along a length direction of the battery module 4. Certainly, the electrode assemblies may alternatively be arranged in any other manners. Further, the plurality of electrode assemblies 5 may be fixed by fasteners.

Optionally, the battery module 4 may further include a housing with an accommodating space, and the plurality of electrode assemblies 5 are accommodated in the accommodating space.

In some embodiments, the battery module may be further assembled into a battery pack, and the battery pack may include one or more battery modules. The specific quantity may be chosen by persons skilled in the art according to use and capacity of the battery pack.

Figure 8:
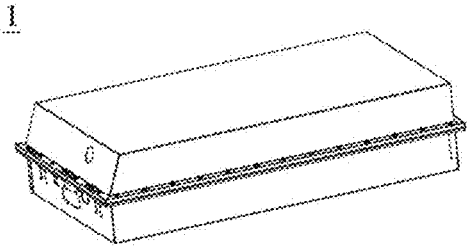
FIG. 8 is a schematic diagram of a battery pack according to an embodiment of this application.
Figure 9:
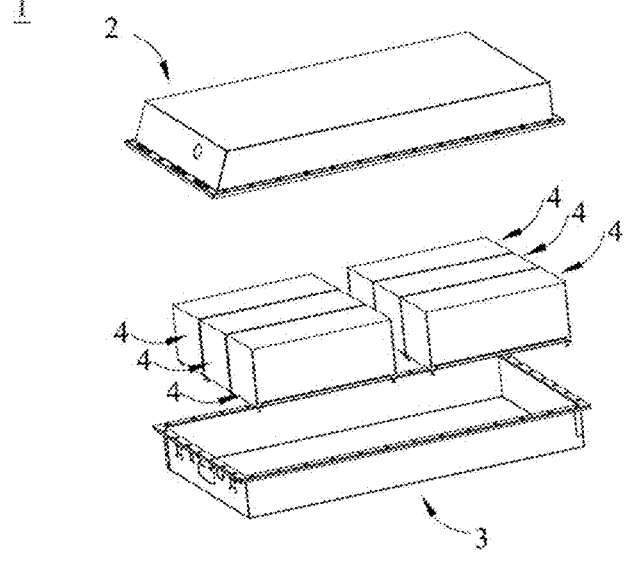
FIG. 9 is an exploded view of the battery pack according to the embodiment of this application in FIG. 8.

FIG. 8 and FIG. 9 show a battery pack 1 as an example. Referring to FIG. 8 and FIG. 9, the battery pack 1 may include a battery box and multiple battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the electrode assembly, the battery module, or the battery pack provided in this application. The electrode assembly, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The electrode assembly, the battery module, or the battery pack may be selected for the electric apparatus based on requirements for using the electric apparatus.

Figure 10:
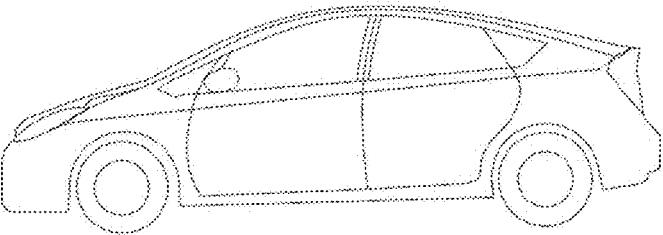
FIG. 10 is a schematic diagram of an electric apparatus according to an embodiment of this application.

FIG. 10 shows an electric apparatus as an example. The electric apparatus is a battery electric vehicle, a hybrid electric vehicle, a plug-in hybrid electric vehicle, or the like. To satisfy requirements of the electric apparatus for high power and high energy density of an electrode assembly, a battery pack or a battery module may be used.

In another example, the apparatus may be a mobile phone, a tablet computer, a notebook computer, or the like. Such apparatus is generally required to be light and thin and may use an electrode assembly as its power source.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field, or made in accordance with product instructions. The reagents or instruments used are all conventional products that are commercially available if no manufacturer is indicated.

Example 1

Preparation of Binder

In step 1, 800 g of deionized water, 3 g of sodium perfluoropolyether carboxylate, and 1.5 g of di-isopropyl peroxydicarbonate were added into a 5 L high-pressure reactor A and stirred, evacuation was performed, and the gas was replaced with nitrogen. Then, vinylidene fluoride and hexafluoropropylene gases were introduced into the high-pressure reactor A to increase a pressure in the high-pressure reactor to 3.5 MPa; a system reaction temperature was raised to 75° C., and then polymerization reaction was started. When the pressure in the high-pressure reactor A decreased to 3.0 MPa, the vinylidene fluoride and hexafluoropropylene gases were continued to be introduced so as to control the pressure in the high-pressure reactor A at 3.0 MPa-3.5 MPa, and a total amount of the added vinylidene fluoride and hexafluoropropylene was 200 g. The reaction stopped when the pressure decreased to below 2 MPa, and then a seed emulsion was obtained.

In step 2, 75.24 g of methyl acrylate, 18.55 g of acrylonitrile, and 6.21 g of acrylamide were separately added into a reactor B at a molar ratio of 1:0.4:0.1, then 3.6 g of sodium dodecyl sulfonate and 100 g of deionized water were added, and the mixture was well stirred for dispersion and emulsification to obtain a shell-layer monomer pre-emulsion.

In step 3, 100 g of deionized water was added into the high-pressure reactor A, the shell-layer monomer pre-emulsion in the reactor B and an initiator solution (a solution formed by dissolving 0.2 g of potassium persulfate in deionized water) were slowly dropwise added using a peristaltic pump, after the dropwise addition was completed, the mixture was heated to 90° C. and maintained at that temperature for reaction for 0.5 h, and then cooled down to 40° C., the pH was regulated to 7-8 with ammonium hydroxide, and then the mixture was filtered and discharged.

Preparation of Separator

Commercially available PP-PE copolymer microporous film with a thickness of 20 μm and an average pore size of 80 nm was used as a substrate. The binder prepared as described above was added into deionized water and stirred and mixed to uniformity, to obtain a slurry (with a solid content of 20%). The slurry was uniformly applied onto both surfaces of the substrate and dried to remove the solvent, with the composition applied on the substrate having a density of 1.0 g/m2 to obtain a separator.

Preparation of Positive Electrode Plate

Polyvinylidene fluoride (PVDF), lithium iron phosphate (LFP), a conductive agent carbon black, and N-methylpyrrolidone (NMP), at a mass ratio of 1.2:58.38:0.42:40, were well mixed and stirred to prepare a positive electrode slurry. The positive electrode slurry was uniformly applied onto a positive electrode current collector aluminum foil with a loading amount of 200 g/m2, followed by drying, cold pressing, and slitting, to obtain a positive electrode plate.

Preparation of Negative Electrode Plate

Artificial graphite, a conductive agent acetylene black, a binder styrene-butadiene rubber (SBR), and a thickener sodium carboxymethyl cellulose (CMC-Na), at a mass ratio of 96.2:1.0:1.6:1.2, were added into deionized water and well mixed and stirred to prepare a negative electrode slurry (with a solid content of 63%). The negative electrode slurry was uniformly applied onto a negative electrode current collector copper foil with a loading amount of 98 g/m2, followed by drying, cold pressing, and slitting, to obtain a negative electrode plate.

Preparation of Electrolyte

At 25° C., ethylene carbonate (EC), ethyl methyl carbonate (EMC), and diethyl carbonate (DEC), at a volume ratio of 1:1:1, were mixed to obtain a mixed solvent, and then $LiPF_6$ was dissolved in the mixed solvent to obtain an electrolyte, where a concentration of $LiPF_6$ was 1 mol/L.

Preparation of Battery Cell

The foregoing positive electrode plate, separator, and negative electrode plate were stacked in sequence and wound, and pre-pressed and formed (during which the separator was adhered to the electrode plates), to obtain an electrode assembly. The electrode assembly was placed in an outer package, the foregoing electrolyte was added, and processes such as sealing, standing, formation, and aging were performed to obtain a battery cell.

The experimental data of examples 2 to 17 were obtained by changing parameters on the basis of example 1 (as shown in Table 1).

Comparative Example 1: Preparation Steps of Polyvinylidene Fluoride Polymer 200 g of deionized water, 1 g of sodium perfluoropolyether carboxylate, and 0.5 g of di-isopropyl peroxydicarbonate were added into a high-pressure reaction vessel and stirred, evacuation was performed, and the gas was replaced with nitrogen. Then, vinylidene fluoride and hexafluoropropylene gases were introduced into the high-pressure reaction vessel to increase a pressure in a high-pressure reactor to 3.5 MPa; a system reaction temperature was raised to 75° C., and then polymerization reaction was started. When the pressure in the high-pressure reaction vessel decreased to 3.0 MPa, the vinylidene fluoride and hexafluoropropylene gases were continued to be introduced so as to control the pressure in the high-pressure reaction vessel at 3.0 MPa-3.5 MPa, and a total amount of the added vinylidene fluoride and hexafluoropropylene was 200 g. The reaction stopped when the pressure decreased to below 2 MPa, and then the mixture was filtered and discharged.

Comparative Example 2: Preparation Steps of Polymer Obtained by Polymerization of First Polymeric Flexible Monomer 752.4 g of methyl acrylate, 36 g of sodium dodecyl sulfonate, and 1.2 kg of deionized water were added into a three-necked bottle and well stirred for dispersion and emulsification. The temperature was raised to 70° C. and an initiator solution (a solution formed by dissolving 0.6 g of potassium persulfate in deionized water) was added and stirred for reaction for 30 min. Then the temperature was continued to raise to 80° C., and an initiator solution (a solution formed by dissolving 1.2 g of potassium persulfate in 100 g of deionized water) was slowly dropwise added using a peristaltic pump. After the dropwise addition was completed, the mixture was heated to 90° C. and maintained at that temperature for reaction for 0.5 h, and then cooled down to 40° C., the pH was regulated to 7 with ammonium hydroxide, and then the mixture was filtered and discharged.

Comparative Example 3: Preparation Steps of Polymer Obtained by Polymerization of Second Polymeric Polar Monomer Deionized water and an initiator with a specified ratio were added into a three-necked flask equipped with a reflux condenser, a thermometer, and a stirring magnet. After stirred to uniformity at room temperature, the mixture was heated to a given temperature to induce decomposition of the initiator. After the temperature was kept constant for about half an hour, a peristaltic pump was used to control the concentration of acrylonitrile into the polymerization system, and the monomer was added into water in small droplets to implement a polymerization reaction. After the monomer was dropwise added, the reaction was continued for a specified period at a constant temperature under stirring. After the reaction ended, the three-necked flask was cooled in the air to room temperature, the reaction stopped, and the mixture was filtered and discharged.

Comparative Example 4: Preparation Steps of Polymer Obtained by Polymerization of Third Polymeric Molecular Weight Regulating Monomer 30 g-90 g of acrylamide monomer was added into 120 g of water to prepare an acrylamide solution, and 0.02 g-1 g of persulfate was dissolved in 30 g of water to obtain an initiator solution. 37.5 g of a solvent isopropanol was added into a 250 mL four-necked reaction bottle, stirred at a stirring speed of 200 r/min, and heated to reflux. The monomer solution and the initiator solution were continuously dropwise added at a controlled dropwise addition speed for a dropwise addition time of 120 min. The reflux reaction was kept for 2 h, the isopropanol was distilled out to obtain a polyacrylamide solution, and then the polyacrylamide solution was filtered and discharged.

Comparative Example 5: Mixing Polymerization Steps of Polyvinylidene Fluoride and Polyacrylate The polyvinylidene fluoride solution prepared in comparative example 1 and the polyacrylate solution prepared in comparative example 2 were mixed at a mass ratio of 1:1 and well stirred to obtain a mixed solution of polyvinylidene fluoride and polyacrylate, and then the mixed solution was filtered and discharged.

As shown in Tables 1 and 2, in examples 1 to 4 and examples 16 and 17, the ratios of the three polymers of the core layer were changed while all other conditions remained unchanged; and in examples 5 to 8 and examples 12 to 15, the masses of the core layer and shell layer were changed while all other conditions remained unchanged.

As shown in Table 3, comparative example 1 is the binder prepared from the polyvinylidene fluoride polymer; comparative example 2 is the binder prepared from the acrylate polymer; comparative example 3 is the binder prepared from the acrylonitrile polymer; comparative example 4 is the binder prepared from the acrylamide polymer; and comparative example 5 is the binder prepared from the polymer obtained through mixing polymerization of polyvinylidene fluoride and polyacrylate.

TABLE 1

| | | | | | | | Experimental data parameter table | | | | | | |
| Parameter | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Core layer | Mass ratio of core layer to shell layer | 2 | 2 | 2 | 2 | 25 | 50 | 75 | 100 | 2 | 2 | 2 |
| Shell layer | | 1 | 1 | 1 | 1 | 1 | 1 | 1 | 1 | 1 | 1 | 1 |
| Flexible monomer | Molar ratio of three types of monomers | 1 | 1 | 1 | 1 | 1 | 1 | 1 | 1 | 1 | 1 | 1 |
| Polar monomer | | 0.4 | 0.01 | 0.5 | 0.8 | 0.01 | 0.01 | 0.01 | 0.01 | 0.01 | 0.5 | 0.8 |
| Molecular weight regulating monomer | | 0.1 | 0.01 | 0.1 | 0.15 | 0.01 | 0.01 | 0.01 | 0.01 | 0.01 | 0.1 | 0.15 |
| | Median particle size by volume D,50 of binder (μm) | 7 | 7 | 7 | 7 | 8 | 8 | 8 | 8 | 0.5 | 30 | 50 |

TABLE 2

Experimental data parameter table

| Parameter | | Example 12 | Example 13 | Example 14 | Example 15 | Example 16 | Example 17 |
|---|---|---|---|---|---|---|---|
| Core layer | Mass ratio | 1.5 | 110 | 10 | 80 | 2 | 2 |
| Shell layer | of core layer to shell layer | 1 | 1 | 1 | 1 | 1 | 1 |
| Flexible monomer | Molar ratio of | 1 | 1 | 1 | 1 | 1 | 1 |
| Polar monomer | three types of | 0.01 | 0.01 | 0.01 | 0.01 | 0.05 | 0.7 |
| Molecular weight regulating monomer | monomers | 0.01 | 0.01 | 0.01 | 0.01 | 0.05 | 0.12 |
| Median particle size by volume D$_v$50 of binder (μm) | | 8 | 8 | 8 | 8 | 7 | 7 |

TABLE 3

Experimental data parameter table

| Parameter | Comparative example 1 | Comparative example 2 | Comparative example 3 | Comparative example 4 | Comparative example 5 |
|---|---|---|---|---|---|
| Polyvinylidene fluoride polymer | 100% | / | / | / | / |
| Acrylate polymer | / | 100% | / | / | / |
| Acrylonitrile polymer | / | / | 100% | / | / |
| Acrylamide polymer | / | / | / | 100% | / |
| Polymer obtained by mixing polymerization of polyvinylidene fluoride and polyacrylate | / | / | / | / | 100% |
| Median particle size by volume D$_v$50 of binder (μm) | 7 | 7 | 7 | 7 | 7 |

Performance Test

1. Test Steps of Adhesion Force Between Separator and Electrode Plate

A battery electrode plate and a separator were stacked and placed on a hot pressing machine, where parameters of the hot pressing machine were set as follows: temperature was 25° C., pressure was 10 t, and time was 30 s. A sample of adhered separator/positive electrode plate was obtained under the action of pressure. The sample of adhered separator/electrode plate was cut into rectangular sample strips of 150 mm×20 mm. An electrode plate side of the rectangular sample strip was attached to a steel plate with a double-sided tape, and the separator was separated from the electrode plate by 2 cm along a length direction at one end of the rectangular sample strip to obtain a test specimen.

The steel plate was kept horizontal and fixed with a lower clamp of a universal testing machine (Model CTM2100 from Xie Qiang Instrument Manufacturing (Shanghai) Co., Ltd.), and the peeled end of the separator was fixed with an upper clamp of the universal testing machine and connected to a tensile machine. The test conditions were set to a stretching speed of 20 mm/min and a horizontal pull of 10 cm. After the tension became stable, the tension value was recorded, and the adhesion force between the separator and the electrode plate was obtained based on a ratio of the tension value to width of the sample.

2. Test Steps of Large-Clamp Cycling Performance

A clamping force of 10000 N was applied outside a cell, and a cycling test was performed under this condition according to the following steps: at 25° C., the battery prepared in example 1 was constant-current charged to 3.8

V at ⅓C, then constant-voltage charged to 0.05 C at 3.8 V, left standing for 5 min, and then discharged to 2.0 V at ⅓C; and the resulting discharge capacity was recorded as an initial capacity C0. The preceding steps were repeated for the same battery and the discharge capacity Cn after the n-th cycle was recorded, and the battery capacity retention rate Pn after each cycle=(Cn/C0)×100%. The battery capacity retention rate after 500 cycles can be used to reflect the difference in cycling performance.

TABLE 4

Performance test parameter table

| | Adhesion force between separator and electrode plate (N/m) | Battery capacity retention rate (%) |
|---|---|---|
| Example 1 | 7.40 | 97.0 |
| Example 2 | 7.06 | 96.1 |
| Example 3 | 7.45 | 97.5 |
| Example 4 | 7.36 | 97.2 |
| Example 5 | 7.21 | 96.6 |
| Example 6 | 7.27 | 96.7 |
| Example 7 | 6.62 | 95.3 |
| Example 8 | 5.30 | 94.1 |
| Example 9 | 6.07 | 94.6 |
| Example 10 | 6.98 | 95.8 |
| Example 11 | 6.06 | 94.6 |
| Example 12 | 7.02 | 95.8 |
| Example 13 | 5.28 | 94.0 |

TABLE 4-continued

Performance test parameter table

| | Adhesion force between separator and electrode plate (N/m) | Battery capacity retention rate (%) |
| --- | --- | --- |
| Example 14 | 7.14 | 96.3 |
| Example 15 | 6.40 | 95.0 |
| Example 16 | 7.09 | 96.4 |
| Example 17 | 7.38 | 97.3 |
| Comparative example 1 | 5.01 | 93.5 |
| Comparative example 2 | 5.25 | 93.5 |
| Comparative example 3 | 4.35 | 93.2 |
| Comparative example 4 | 2.89 | 88.2 |
| Comparative example 5 | 5.07 | 93.7 |

As shown in Table 4, the cells obtained using the binders in examples 1 to 17 show good adhesion force between the separator and the electrode plate, while the cells obtained using the binders in comparative examples 1 to 5 show adhesion force not as good as that in examples 1 to 17. This indicates that the binders in examples 1 to 17 have better adhesion performance than the binders in comparative examples 1 to 5. In addition, the batteries in examples 1 to 17 show better cycling performance than the batteries in comparative examples 1 to 5. This indicates that under the condition of improved adhesion performance of a binder, applying such binder to a separator of a battery can effectively improve the cycling performance of the battery.

The foregoing descriptions are merely preferred embodiments of this application, but are not intended to limit the patent scope of this application. All equivalent structural transformations made by using the content of the specification and drawings of this application or directly/indirectly used in other related technical fields under the application conception of this application are included in the patent protection scope of this application.

What is claimed is:

1. A binder, wherein the binder comprises a core layer structure and a shell layer structure provided on surface of the core layer structure, wherein the shell layer structure comprises a polyacrylate polymer, and the core layer structure comprises a polyvinylidene fluoride polymer;

constituent monomers of the polyacrylate polymer comprise a first polymeric flexible monomer, a second polymeric polar monomer, and a third polymeric molecular weight regulating monomer;

a molar ratio of the first polymeric flexible monomer, the second polymeric polar monomer, and the third polymeric molecular weight regulating monomer is 1:(0.01-0.8):(0.01-0.15); and the first polymeric flexible monomer contains an ester bond in structure, the second polymeric polar monomer contains a cyano group in structure, and the third polymeric molecular weight regulating monomer contains an amide bond.

2. The binder according to claim 1, wherein the shell layer structure comprises multiple shells, the multiple shells being spaced apart on the surface of the core layer structure.

3. The binder according to claim 1, wherein a mass ratio of the polyvinylidene fluoride polymer to the polyacrylate polymer is (2-100):1.

4. The binder according to claim 1, wherein a median particle size by volume $D_v50$ of the binder is 0.5 μm-50 μm.

5. The binder according to claim 1, wherein a molar ratio of the first polymeric flexible monomer, the second polymeric polar monomer, and the third polymeric molecular weight regulating monomer is 1:(0.05-0.7):(0.05-0.12).

6. The binder according to claim 1, wherein the first polymeric flexible monomer is an acrylate monomer, the second polymeric polar monomer is an acrylonitrile monomer, and the third polymeric molecular weight regulating monomer is an acrylamide monomer.

7. The binder according to claim 6, wherein the acrylate monomer comprises at least one of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate;

and/or the acrylonitrile monomer comprises at least one of acrylonitrile and methacrylonitrile;

and/or the acrylamide monomer comprises at least one of acrylamide, N-methylolacrylamide, and N-butoxymethylacrylamide.

8. The binder according to claim 1, wherein the polyvinylidene fluoride polymer comprises at least one of vinylidene fluoride polymer, vinylidene fluoride-hexafluoropropylene copolymer, vinylidene fluoride-pentafluoropropylene copolymer, vinylidene fluoride-tetrafluoropropylene copolymer, vinylidene fluoride-trifluoropropylene copolymer, vinylidene fluoride-perfluorobuttene copolymer, vinylidene fluoride-tetrafluoroethylene copolymer, vinylidene fluoride-trifluoroethylene copolymer, vinylidene fluoride-trifluorochloroethylene copolymer, or vinylidene fluoride-fluoroethylene copolymer.

9. A separator, wherein the separator comprises the binder according to claim 1.

10. An electrode assembly, wherein the electrode assembly comprises the separator according to claim 9.

11. A battery, wherein the battery comprises the battery cell according to claim 10.

12. An electric apparatus, wherein the electric apparatus comprises the battery cell according to claim 10.

13. A preparation method of binder, comprising:

adding water, an emulsifier, an initiator, and constituent monomers of a polyvinylidene fluoride polymer into a reaction vessel, stirring, and heating under a reaction pressure for polymerization reaction, to obtain a seed emulsion for later use;

mixing and stirring water, an emulsifier, and constituent monomers of a polyacrylate polymer to obtain a shell-layer monomer pre-emulsion for later use; and putting the shell-layer monomer pre-emulsion and an initiator into the seed emulsion, and performing stirring and heating for reaction, to obtain a core-shell-structured binder, wherein constituent monomers of the polyacrylate polymer comprise a first polymeric flexible monomer, a second polymeric polar monomer, and a third polymeric molecular weight regulating monomer;

a molar ratio of the first polymeric flexible monomer, the second polymeric polar monomer, and the third polymeric molecular weight regulating monomer is 1:(0.01-0.8):(0.01-0.15); and the first polymeric flexible monomer contains an ester bond in structure, the second polymeric polar monomer contains a cyano group in structure, and the third polymeric molecular weight regulating monomer contains an amide bond.

14. The preparation method of binder according to claim 13, wherein a mass ratio of the constituent monomers of the polyvinylidene fluoride polymer to the constituent monomers of the polyacrylate polymer is (2-100):1.

15. The preparation method of binder according to claim 13, wherein the constituent monomers of the polyvinylidene fluoride polymer comprise vinylidene fluoride;

or the constituent monomers of the polyvinylidene fluoride polymer comprise at least one of vinylidene fluoride, hexafluoropropylene, pentafluoropropylene, tetrafluoropropylene, trifluoropropylene, perfluorobutene, tetrafluoroethylene, trifluoroethylene, trifluorochloroethylene, and fluoroethylene.

16. A separator, wherein the separator comprises the binder prepared using the preparation method of binder according to claim 13.

17. A battery cell, wherein the battery cell comprises the electrode assembly according to claim 16.

* * * * *